(12) United States Patent
Osbourn et al.

(10) Patent No.: US 6,304,675 B1
(45) Date of Patent: Oct. 16, 2001

(54) VISUAL CLUSTER ANALYSIS AND PATTERN RECOGNITION METHODS

(75) Inventors: Gordon Cecil Osbourn; Rubel Francisco Martinez, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 08/174,548

(22) Filed: Dec. 28, 1993

(51) Int. Cl.$^7$ ............................................. G06K 9/62

(52) U.S. Cl. ............................................. 382/225; 382/209

(58) Field of Search ....................... 382/181, 209, 382/224, 225, 228, 159, 170

(56) References Cited

U.S. PATENT DOCUMENTS

| | | | |
|---|---|---|---|
| 4,937,747 | 6/1990 | Koller | 364/422 |
| 4,991,092 | 2/1991 | Greensite | 364/413.33 |
| 5,010,574 | 4/1991 | Wang | 381/42 |
| 5,012,675 | 5/1991 | Koller et al. | 73/432.1 |
| 5,040,133 | 8/1991 | Feintuch et al. | 364/581 |
| 5,060,277 | 10/1991 | Bokser | 382/14 |
| 5,075,896 | 12/1991 | Wilcox et al. | 382/39 |
| 5,124,932 | 6/1992 | Lodder | 364/498 |

OTHER PUBLICATIONS

Pitas et la. "Texture Analysis and Segmentation of Seismic Images", 1989, pp 1437–1440.*
A. Jain et al., Alogorithms for Clustering Data, Prentice Hall, 1988.
R. Duda et al., Pattern Classification and Scene Analysis, John Wiley, 1973.
D. Hand, Discrimination and Classification, John Wiley, 1981.
A. Jain, "Cluster Analysis," *Handbook of Pattern Recognition and Image Processing,* Academic Press, Inc., 1986, pp. 33–57.
C. Zahn, "Graph–Theoretical Methods for Detecting and Describing Gestalt Clusters," *IEEE Transactions on Computers,* vol. C20, No. 1, Jan. 1971, pp. 68–86.
J. O'Callaghan, "An Alternative Definition For 'Neighborhood of a Point'," *IEEE Transactions on Computers,* vol. C24, No. 11, Nov. 1975, pp. 1121–1125.
G. Toussaint, "The Relative Neighborhood Graph of a Finite Planar Set," Pattern Recognition, vol. 12, 1980, pp. 261–268.
R. Urquhart, "Graph Theoretical Clustering Based on Limited Neighborhood Sets," *Pattern Recognition,* vol. 15, No. 3, 1982, pp. 173–187.
M. Krivanek, "The Use of Graphs of Elliptical Influence in Visual Hierarchical Clustering," *Lecture Notes in Computer Science,* vol. 452, 1990, pp. 392–398.
M Ichino et al., "The Relative Neighborhood Graph For Mixed Feature Variables," Pattern Recognition, vol. 18, No. 2, 1985, pp. 161–167.
N. Ahuja et al., "Extraction of Early Perceptual Strucute in Dot Patterns: Integrating Region, Boundary, and Component Gestalt," *Computer Vision, Graphics, and Image Processing,* vol. 48, 1989, pp. 304–356.
R. Jarvis et al., "Clustering Using a Similarity Measure Based on Shared Near Neighbors," *IEEE Transactions on Computers,* vol. C22, No. 11, Nov. 1973, pp. 1025–1034.

(List continued on next page.)

*Primary Examiner*—Jon Chang
(74) *Attorney, Agent, or Firm*—Karuno Ojanen; Luis Ortiz

(57) ABSTRACT

A method of clustering using a novel template to define a region of influence. Using neighboring approximation methods, computation times can be significantly reduced. The template and method are applicable and improve pattern recognition techniques.

2 Claims, 20 Drawing Sheets

OTHER PUBLICATIONS

G. Toussaint, "Pattern Recognition and Geometrical Complexity," Proceedings of the 5th International Conference on Pattern Recognition 1980, pp. 1324–1347.

D. Matula et al., "Properties of Gabriel Graphs Relevant to Geographic Variation Research and the Clustering of Points in the Plane," Geographic Analysis, vol. 12, No. 3, Jul. 1980, pp. 205–222.

M. Wertheimer, "Laws of Organization in Perceptual Forms," translated into English in *A Source Book of Gestalt Psychology,* W. Ellis (ed.), Routledge and Kegan Paul, 1938, pp. 71–88.

R. Bell et al., "Influence of Anchors Upon the Operation of Certain Gestalt Organizing Principles," *J. Expt. Psychology,* vol. 78, No. 4, 1968, pp. 670–678.

W. Steinberg et al., "Changes in Visual Spatial Organization: Response Frequency Equalization Versus Adaptation Level," *J. Expt. Psychology,* vol. 98, No. 2, 1973, pp. 246–251.

F. McKenna, "Modifying the Gestalt Factor of Proximity: Theories Compared," Perception, vol. 14, 1985, pp. 359–366.

M. Oeffelen et al., "An Algorithm for Pattern Description on the Level of Relative Proximity," *Pattern Recognition,* vol. 16, 1983, p. 341.

J. O'Callaghan, "A Model for Recovering Perceptual Organizations From Dot Patterns," Proceedings of the 3rd International Joint Conference on Pattern Recognition, 1983, , p. 341.

* cited by examiner

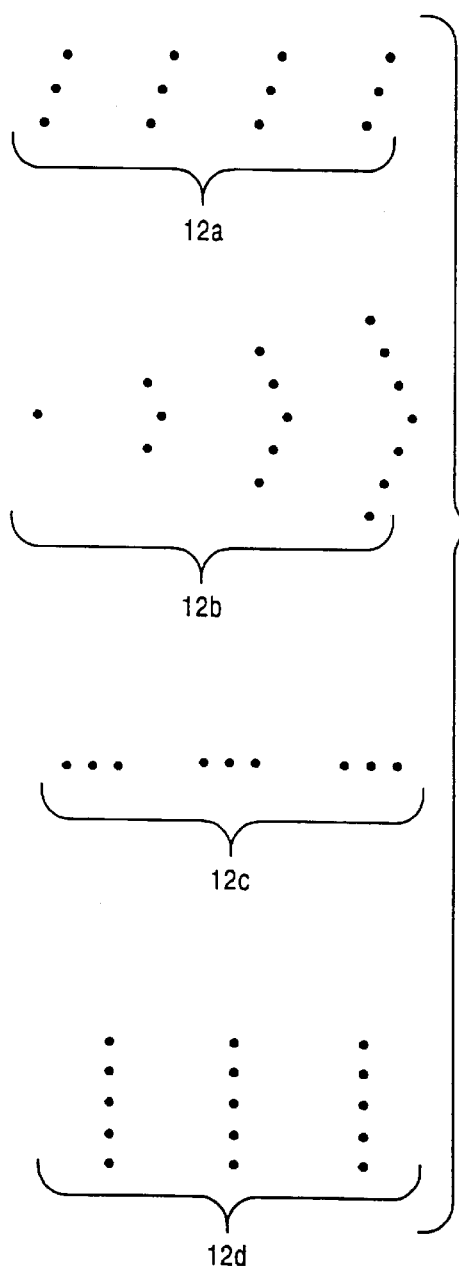
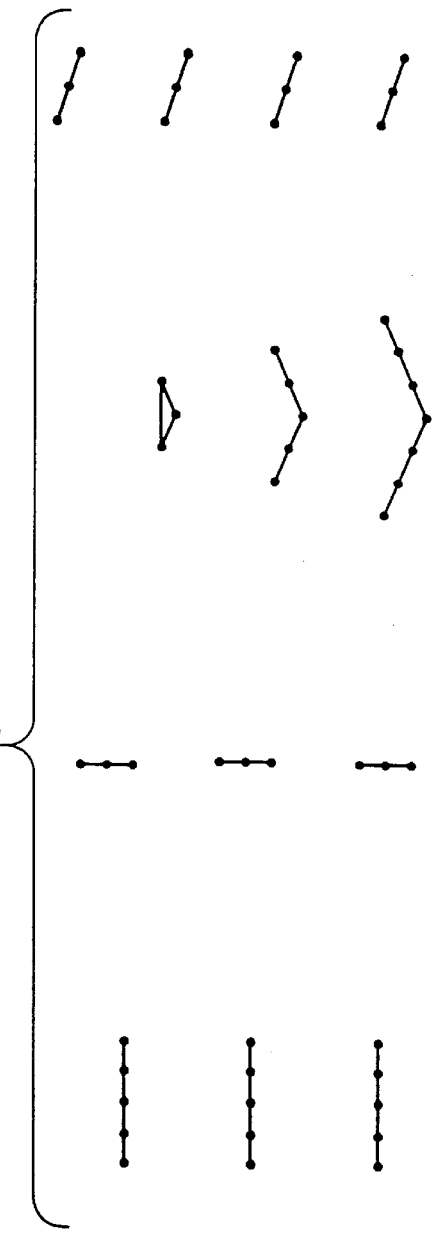
FIG. 12
FIG. 13

17a  17b

17c

17d

21a

21b

21c

21d

VISUAL CLUSTER ANALYSIS AND PATTERN RECOGNITION METHODS

The United States Government has rights in this invention pursuant to Contract No. DE-AC04-76DP00789 between the Department of Energy and American Telephone & Telegraph Company and Contract No. DE-AC04-94AL85000 between the Department of Energy and Sandia Corporation.

BACKGROUND OF THE INVENTION

This invention relates generally to pattern recognition and multivariate analysis, and in particular to a method and a template used for data clustering which simulates the human visual system.

Clustering analysis is a technique used to explore the relationships between data and assess the interaction among data by organizing the data into groups or clusters. Data within a cluster are more similar to each other than are data belonging to other clusters. Jain, A. K., Chapter 2, *Cluster Analysis* from *Handbook of Pattern Recognition and Image Processing*, Academic Press, Inc., pp. 33–57, (1986). Clustering analysis can be used when no prior knowledge regarding the presence or number of such patterns is available. Cluster analysis has applications in machine vision, pattern recognition, unsupervised and supervised machine learning/classification, medical and biological image and data analysis, crop identification from satellite photos, identification of hazardous chemicals in complex environments.

Pattern recognition uses an existing set of training data which have identified groupings or classes and assigns a grouping to newly measured test data. Specific examples of pattern recognition applications include: recognition of a large set of chemicals using a small set of chemical sensor signals; distinguishing vegetation, water, buildings, mineral deposits, etc. in multispectral satellite images; distinguishing different tissue types in medical magnetic resonance imaging data; target recognition in radar images; threat detection and false alarm avoidance in automated intrusion detection in video surveillance images.

Clustering has been broadly classified into the hierarchical and the partitional approaches. The hierarchical structure also has two models, one of which begins with n clusters, one per pattern, and grows a sequence of clusterings until all n patterns are in a single cluster; this approach is referred to as agglomerative. The other hierarchical model, the divisive approach, begins with one cluster containing all n patterns and successively divides clusters until n clusters are achieved. Partitional clustering techniques organize patterns into small numbers of clusters by labeling each pattern in some way, and make use of criterion functions, density estimators, graphs structure and nearest neighbors. Fuzzy partitional clustering deals with the overlapping case in which each pattern is allowed to belong to several classes with a measure of "belongingness" or a weighting factor for each class.

Some present clustering analysis techniques require prior knowledge or assumptions concerning, for example, the mean and location of the cluster pattern, and the cluster result, especially the number of clusters present in the data set. The available clustering systems may also require pattern-dependent adjustments. An example of a hierarchical clustering analysis technique which requires additional input is U.S. Pat. No. 4,937,747 entitled "Iterative Disjoint Cluster and Discriminant Function Processing of Formation Log Responses and Other Data" to Koller and U.S. Pat. No. 5,012,675 entitled "Integrating Multiple Mappable Variables for Oil and Gas Exploration" to Koller et al. These Koller patents require additional information about subsurface structures and use disjoint clustering which requires specifying the number of clusters into which the data set are to be classified, and then uses discriminant function analysis wherein data of one cluster may be assigned to another cluster. U.S. Pat. No. 5,060,277 entitled "Pattern Classification Means using Feature Vector Regions Preconstructed from Reference Data" to Bokser is a partitional clustering technique which requires a priori knowledge about the classification and then generates feature vectors of word processing font data and then compares with references for appropriate classifying into ringed clusters. U.S. Pat. No. 4,991,092 entitled "Image Processor for Enhancing Contrast between Subregions of a Region of Interest" to Greensite generates a distribution density function of a signal which is assigned to a region of interest, then after convolution of the distribution density function, the variance is compared and assigns a particular value to a pixel of the image corresponding to the region of interest.

Clustering has been recognized as an important component of the human visual system since the Gestalt principles were first discussed in Wertheimer, M., "Laws of organization in perceptual form," translated into English in *A Source Book of Gestalt Psychology* (W. Ellis, ed.), pp. 71–88 (1938). Despite many studies in subsequent decades, a quantitative understanding of perceptual grouping/clustering has not been achieved for the human visual system. Achieving human-like performance has been a long standing goal of clustering research but the results of existing clustering analysis techniques often disagree with human visual judgments, even for remarkably simple data patterns. Jain, A. K. and Dubes, R. C., *Algorithms for Clustering Data*, Prentice Hall (1988); Duda, R. O. and Hart, P. E., *Pattern Classification and Scene Analysis*, John Wiley (1973); Hand, D. J., *Discrimination and Classification*, John Wiley (1981); and Jain, supra in *Cluster Analysis* all describe many of these approaches. Prior art pattern recognition techniques also do not provide a well-defined warning when a class assignment of a point is uncertain. This is unlike human perception which readily notices points which cannot be unambiguously assigned to one class of the training data. U.S. Pat. No. 5,040,133 entitled "Adaptive Clusterer" to Feintuch et al. attempts to approximate human vision of gestalts by taking any two points and generating a parameter proportional to the distance between the points, and then taking all points within that parameter as being within the cluster. Although Feintuch's system does not require a priori knowledge about the clusters or the number of clusters, it does not in fact adequately approximate human vision. See also Jain, A. K., "Cluster Analysis" in *Handbook of Pattern Recognition and Image Processing*, Academic Press, 1986; and Zahn, C. T., "Graph-Theoretical Methods for Detecting and Describing Gestalt Clusters," C-20 IEEE TRANS. COMPUTERS 68 (1971).

Another drawback of some existing techniques is the computational time required to compute clusters or class assignments. Computational time becomes important for applications such as image analysis, where large numbers of data points, typically >$10^5$, are examined.

Some clustering techniques use a region of influence or template to determine clusterings between each pair of data points. A template area of fixed shape is examined around each pair of points in the data, and the pair is grouped together if no other data points occur within the template area. If other data points do occur in the template area, they are referred to as inhibitor points below. Successful regions of influence must cover an appropriately large and appropriately located area to avoid extra grouping errors while simultaneously being small enough to avoid the onset of missed grouping errors. A number of template shapes have been examined and are shown in FIG. 21, but none produce clusters in agreement with human perception. See Toussaint, G. T., *The Relative Neighborhood Graph of a Finite Planar Set*, 12 PATTERN RECOGNITION 261 (1980); Urquhart, R., *Graph Theoretical Clustering Based on Limited Neighborhood Sets*, 15 PATT. RECOGNITION 173 (1982); Krivanek, M. *The Use of Graphs of Elliptic Influence in Visual Hierarchical Clustering*, 452 LECTURE NOTES IN COMPUTER SCIENCE 392 (1990). Moreover, the methods of cluster analysis using these templates require computations that scale as $N^3$, where N is the number of data points.

It is thus an object of the invention to provide a clustering template and method that achieves human-like judgment of class membership for n-dimensional test points. The feature of the invention, the psychophysical-derived inhibitory template, when applied to the data set enables the human-like clustering performance.

It is yet another object of the invention to provide a clustering/pattern recognition method to separate data into clusters completely automatically. The clustering template and method described herein require no operator-adjustable parameters or extensive neural net training runs. An advantage of this feature is that presuppositions about the data or the sensing environment are not required and the data can be analyzed from a more objective and neutral perspective.

It is yet another object of the invention when used for pattern recognition to automatically identify test points which might belong to more than one class and to identify outliers. The feature of the invention that achieves this object is the use of clustering to assign class identities to test points.

It is yet another object to provide a clustering/pattern recognition approach that does not require any assumptions concerning the properties of either the training or test data, i.e., non-Gaussian distributions, linearly inseparable distributions, multimodal distributions, highly nonlinear problems are all acceptable.

It is still another object of the pattern recognition method of the invention to evaluate a training set itself for reliable classification and discrimination into classes. The feature which achieves this object is the use of the template in the clustering to confirm class identities of the training data.

It is an object of the invention to cluster large numbers of data points, N, by the method described herein using nearest neighbors to determine approximate groupings and then screening the approximate groupings for exactness in $O[N^2]$ computation time.

These and other objects as well as the features and advantages of the invention are realized by a new approach to clustering and pattern recognition techniques which matches the performance of human perception and judgment. The method is based on an inhibitory template which is applied to each pair of dots in a data set. Direct clustering of the pair is allowed if another data point is absent within the area of the template, but clustering of the two data points is inhibited if there is another data point within the area of the template. The clustering performance of the method is thus entirely determined by the template shape which was determined by psychophysical experiments. The empirical clustering technique incorporates human judgment data of clusters with unlabeled data points and so directly mimics human performance. The resulting method uses no prior knowledge of the data, e.g., number of clusters present, and no data-dependent parameter adjustments. The novel concept of a psychophysically-defined inhibitory template and the absence of adjustable parameters are features which set this approach apart from the prior art. In fact, the invention herein successfully clusters complex data sets from the literature that have collectively thwarted all prior techniques.

A pattern recognition technique is also developed using this same template. The test data points are individually clustered to the training data using the empirical template method. Pattern recognition is applied to a wide variety of sensing problems where signals from sensors are to be interpreted. The measurements from each different sensor are combined as coordinates of a single vector, and the vectors are the data points of interest. A test point is assigned to the class or classes of the training data points with which it clusters. Test points which group with points from a single class are unambiguously assigned that class value. This method readily identifies test points with uncertain class identity as those that cluster with training points from more than one class, i.e., no single class seems appropriate.

Although straightforward application of the template method appears to require $O[N^3]$ computation time, the method is computationally practical and can be implemented to run in $O[N^2]$ for data of arbitrary dimension. The invention also allows for the handling of large data sets through approximations that require computations that scale for two-dimensional data as $O[N\log N]$. The approximations limit the examinations of potential pairs to group together and of potential inhibitor points to ones that are likely to be the most important.

BRIEF DESCRIPTION OF THE DRAWINGS

FIG. 12 depicts a set of simple test clusters.

FIG. 13 presents the test clusters of FIG. 12 as grouped by the clustering method of the invention.

DESCRIPTION OF THE INVENTION

Urquhart, R., *Graph Theoretical Clusterings Based on Limited Neighborhood Sets*, 15 PATT. RECOGNITION 173 (1982) and Krivanek, M., *The Use of Graphs of Elliptic Influence in Visual Hierarchical Clustering*, 452 LECTURE NOTES IN COMPUTER SCIENCE 392 (1990) are hereby incorporated by reference into the specification. These references lay a foundation for cluster analysis. The invention as taught by the following specification brings the cluster analysis methods into a new domain—the production of clusters in agreement with human perception.

Figure 1:
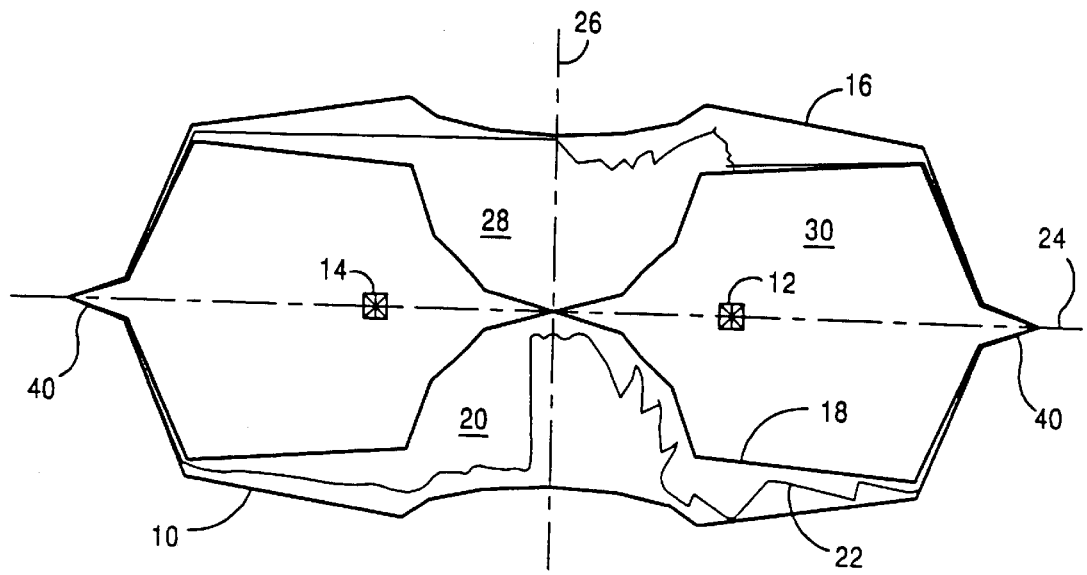
FIG. 1 is an illustration of the template of the invention and an example of the boundaries of the region of influence circumscribed by the template of the clustering method and analysis.
Figure 2:
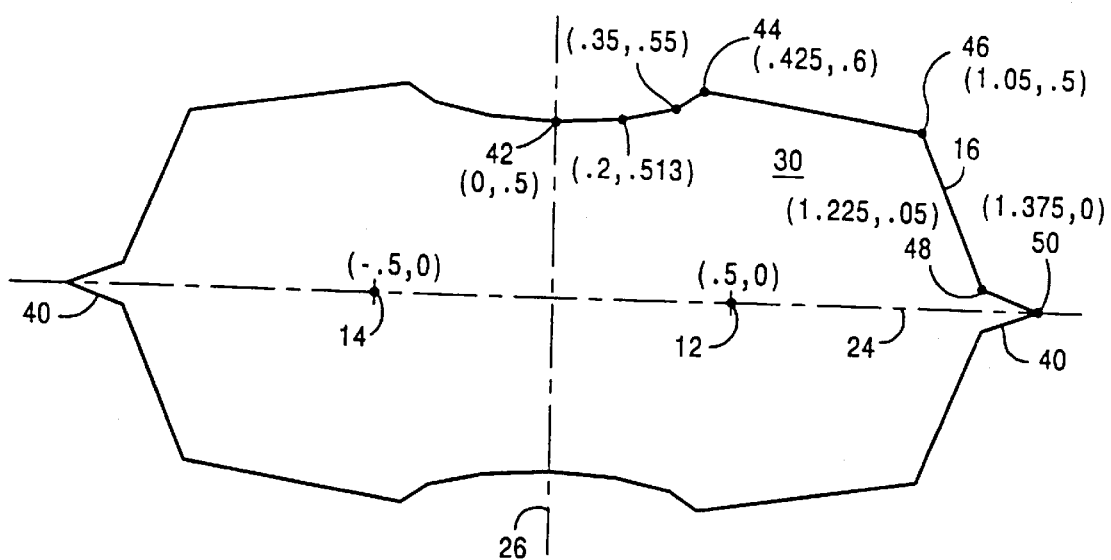
FIG. 2 is an illustration of the maximum outer boundaries and its coordinates of one embodiment of the template of the invention which obtained optimum results when used in the clustering method and analysis.
Figure 3:
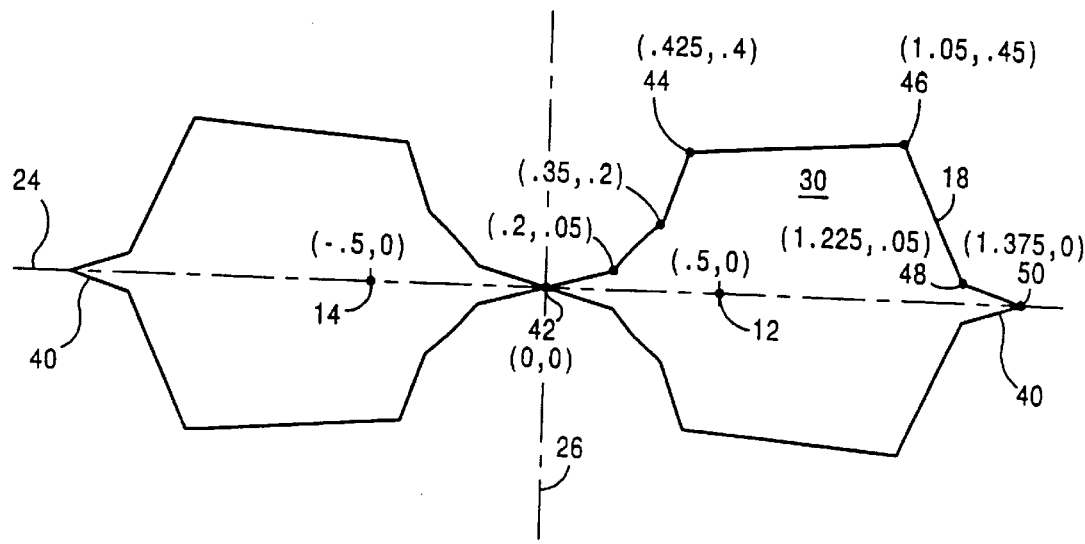
FIG. 3 is an illustration of the minimum boundaries and its coordinates of one embodiment of the template of the invention which obtained optimum results when used in the clustering method and analysis.
Figure 4:
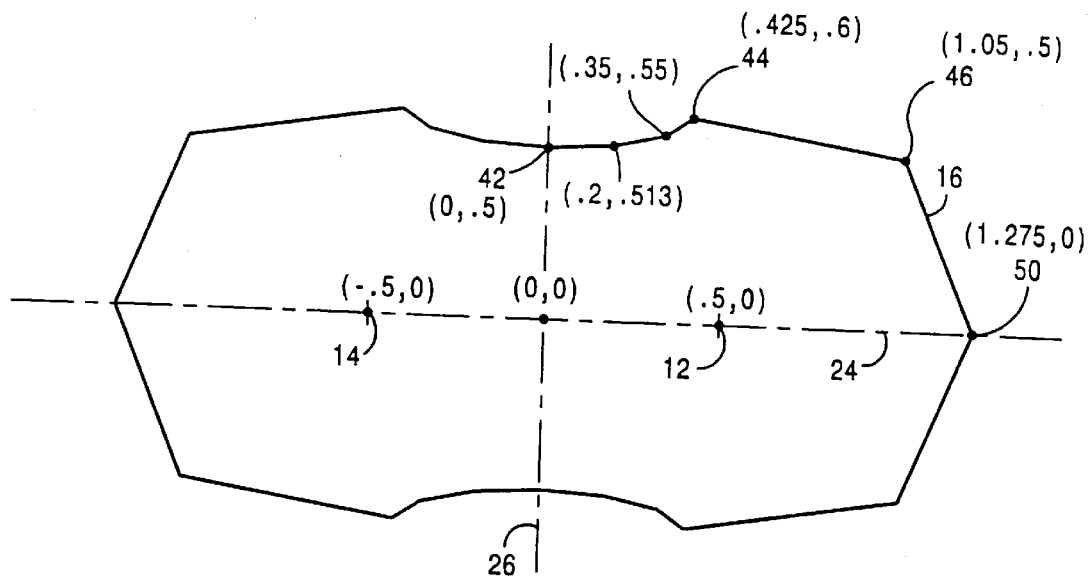
FIG. 4 is an illustration of the maximum boundaries and its coordinates of yet another embodiment of the template of the invention which obtained optimum results when used in the clustering method and analysis.
Figure 5:
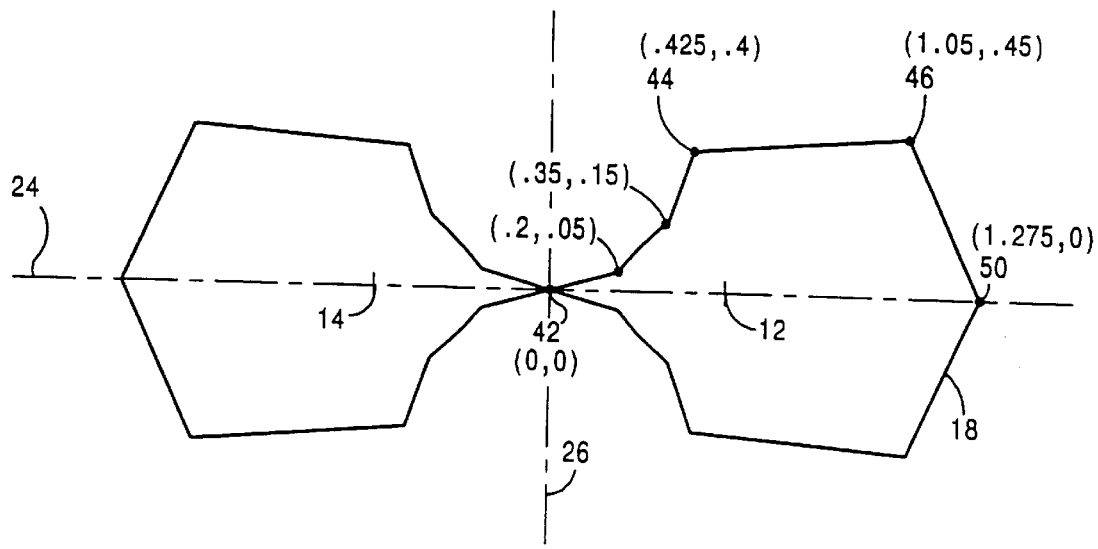
FIG. 5 is an illustration of the minimum boundaries and its coordinates of the above embodiment of the template of the invention which obtained optimum results when used in the clustering method and analysis.
Figure 6:
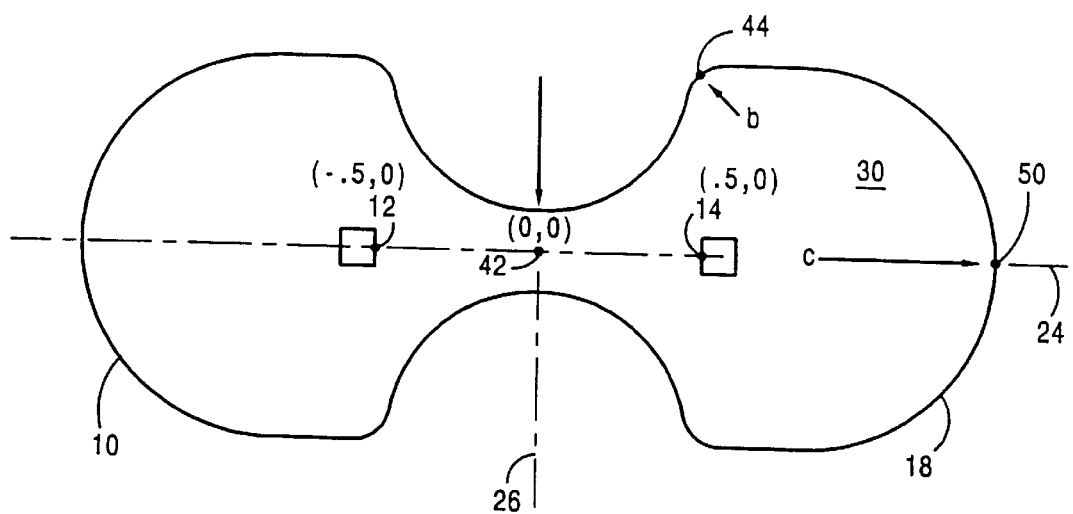
FIG. 6 is an illustration of yet another template of the invention.

The invention is a clustering template 10 having a region of influence 30 as shown in FIG. 1. A region of influence is an area defined about a pair of points such that the pair of points are connected or clustered whenever all the remaining points in the data set lie outside the region of influence. The region of influence 30 represented in FIG. 1 actually has an infinite number of shapes; however, the most preferred region of influence has a maximum outer boundary 16 and minimum outer boundary 18. Thus, any boundary contained within area 20 is a preferred region of influence 30 for reasons which will be explained. The shape and the maximum and minimum boundaries of the template 10 were directly determined from human judgment studies of perceived groupings in a set of constructed test patterns. In general, however, the template 10 is elongated along a major axis 24 compared to the minor axis 26 in an orthogonal direction and exhibits concavities in the central portion 28 between points 12 and 14. If symmetry is established about major axis 24 and minor axis 26, any of the four quadrants of the template defined by these axes determines the shape of the template. A symmetric template 10 yields more computationally efficient results but, although the template 10 shown in FIGS. 2, 3, 4, and 5 has mirror symmetry about axes 24 and 26, the template 10 need not be symmetric. For example, a region of influence 30 having the boundary 22 in FIG. 1 is also preferred and included herein to illustrate that the template need not be symmetric about any axis, nor be concave in the central portion 28. The wedge-shaped protrusion 40 at points 48 and 50 on opposite ends of the template 10 of FIG. 1 provided the best fit to data which were used to determine the shape of the template, but are not necessary as shown in the templates of FIGS. 4 and 5. The template 10 of FIG. 2 represents the maximum boundary 16 of the region of influence 30 and the coordinates of specific points 42, 44, 46, 48 and 50 of the boundary 16 in template units; likewise, FIG. 3 represents the minimum boundary 18 of region of influence 30 and the coordinates of specific points 42, 44, 46, 48 and 50 of boundary 18 in template units as illustrated. FIGS. 4 and 5, similarly, illustrate the region of influence 30 without the wedge-shaped notch 40 having maximum outer boundary 16 and a minimum outer boundary 18, respectively, and the coordinates of specific points 42, 44, 46, and 50 in template units. FIG. 6 illustrates yet another embodiment of a template 10 having a region of influence 30 in which the boundary 18 is made of arcs and line segments.

Of a data set of N points, any two data points to be examined are aligned at points 12 and 14 separated by one arbitrary template unit and located at positions (0.5, 0) and (−0.5,0), where the intersection of major axis 24 and minor axis 26 is assigned (0,0). The template size is scaled and the template orientation is rotated to reflect the separation and orientation of each data pair so that the two examined data points coincide with points 12 and 14. If no other data point is within the enclosed area or region of influence of the adjusted template, then a direct grouping of the two data points is established. If, however, one or more additional data points are within the region of influence, the direct grouping of the two data points is inhibited. Each pair of data points of the data set is tested with the template. Clusters are identified as those distinct groups of data points which are directly or indirectly grouped together after all data have been examined.

A series of distortions of the template empirically define a range of allowable shapes in which the template 10 retains the ability to mimic human performance in discriminating clusters. FIGS. 7–11 illustrate various distortions of the template and graphically illustrate the ability of the distorted template to cluster. For instance, in FIG. 7, the distance along axis 26 of point 42 is varied which affects the concavity of region 28 between the two squares 12 and 14. Even though the distance between point 42 from the axis 24 varies from 0 to approximately 0.5 template units, there are only a minimum of failures. The optimum distance from the axis 24 to point 42 is from 0 to approximately 0.2 template units.

Figure 8:
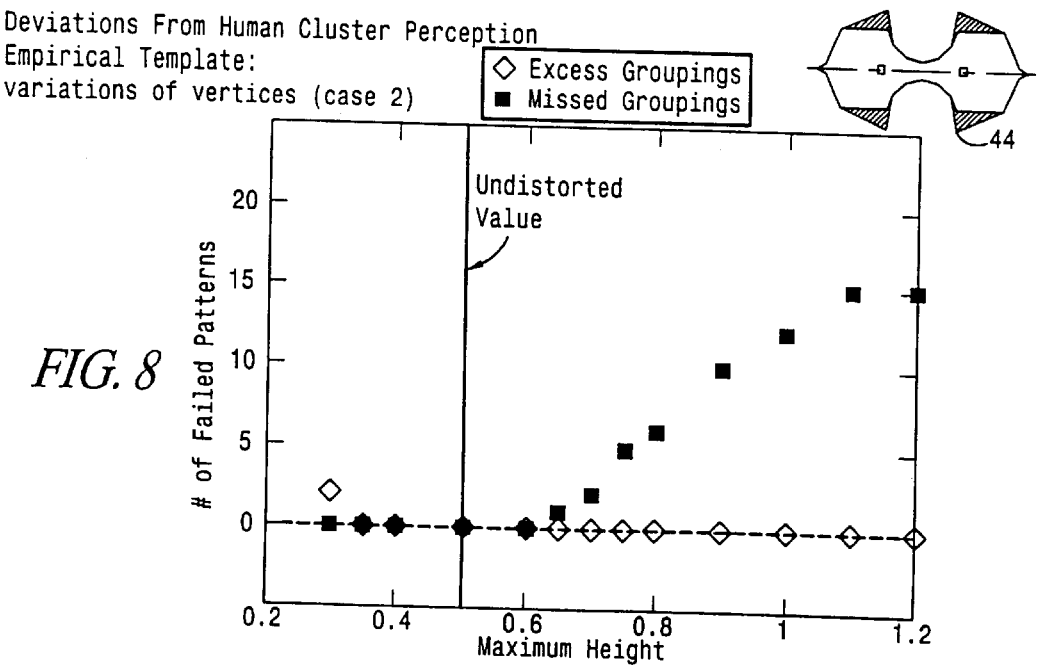
FIG. 8 is an illustration and a graph showing inner height distortion of the template and clustering results thereof.
Figure 9:
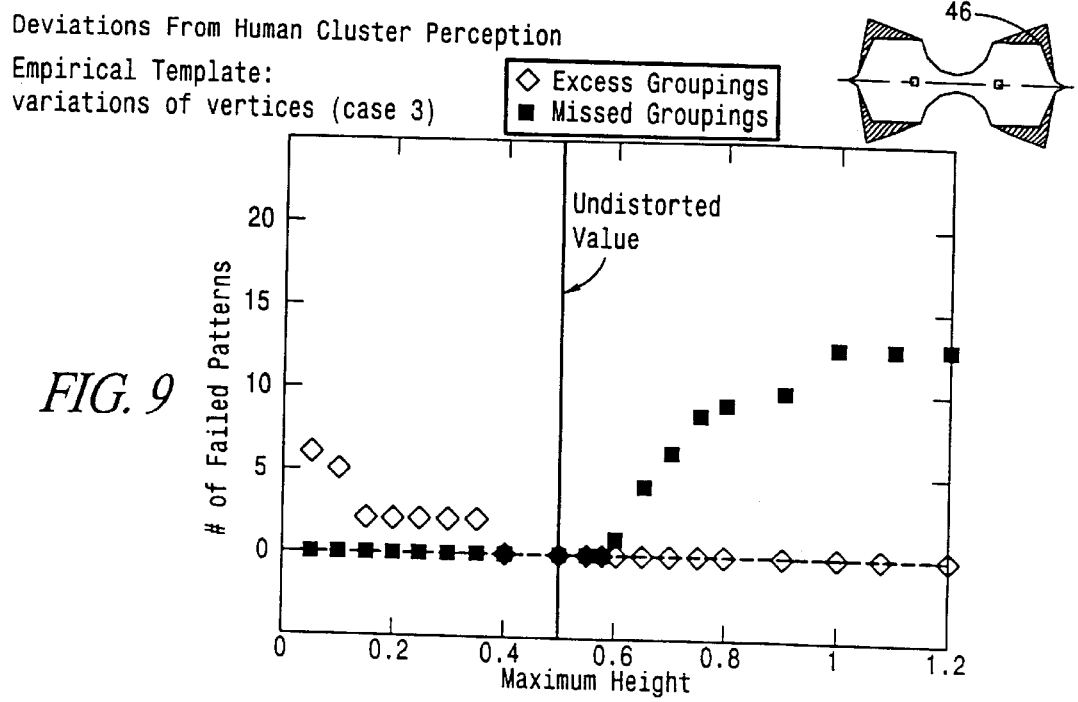
FIG. 9 is an illustration and a graph showing outer height distortion of the template and clustering results thereof.

FIG. 8 illustrates the effects of varying point 44. One skilled in the art can ascertain that by varying only point 44 above and below and at right angles to axis 24, maximum performance of the template is achieved when that point 44 is within the range from slightly below 0.4 to slightly above 0.6 template units. Similarly, FIG. 9 illustrates the variation of point 46 from axis 24. Optimum clustering performance is achieved when point 46 is within 0.4 to 0.6 template units above and below axis 24.

Figure 10:
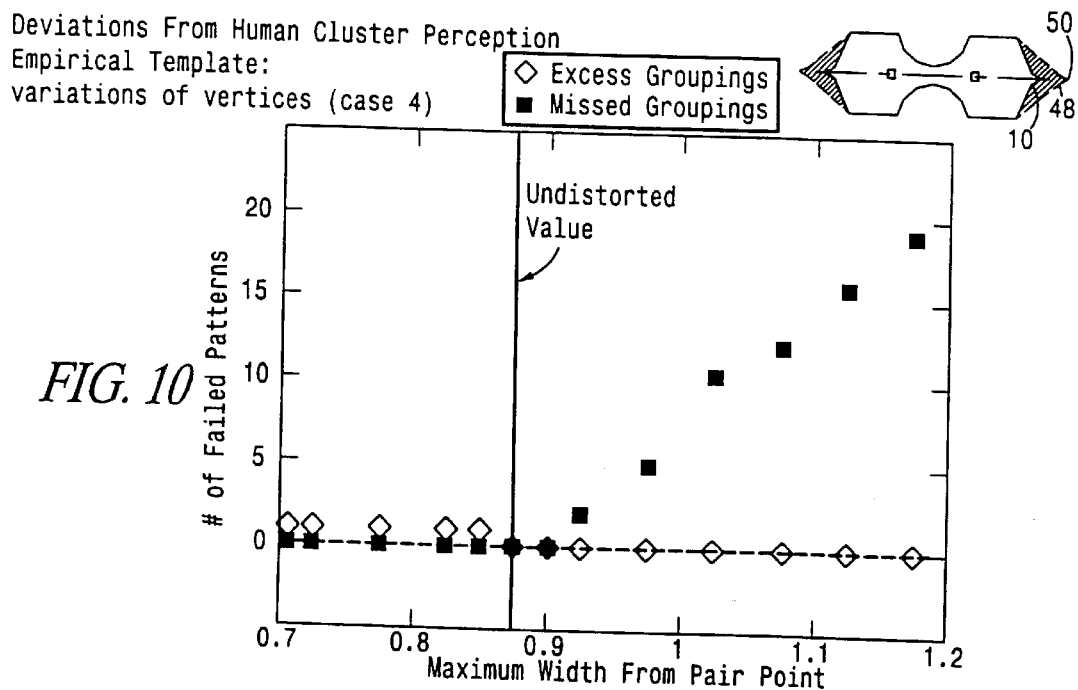
FIG. 10 is an illustration and a graph showing outer horizontal axis distortion of the template and clustering results thereof.
Figure 11:
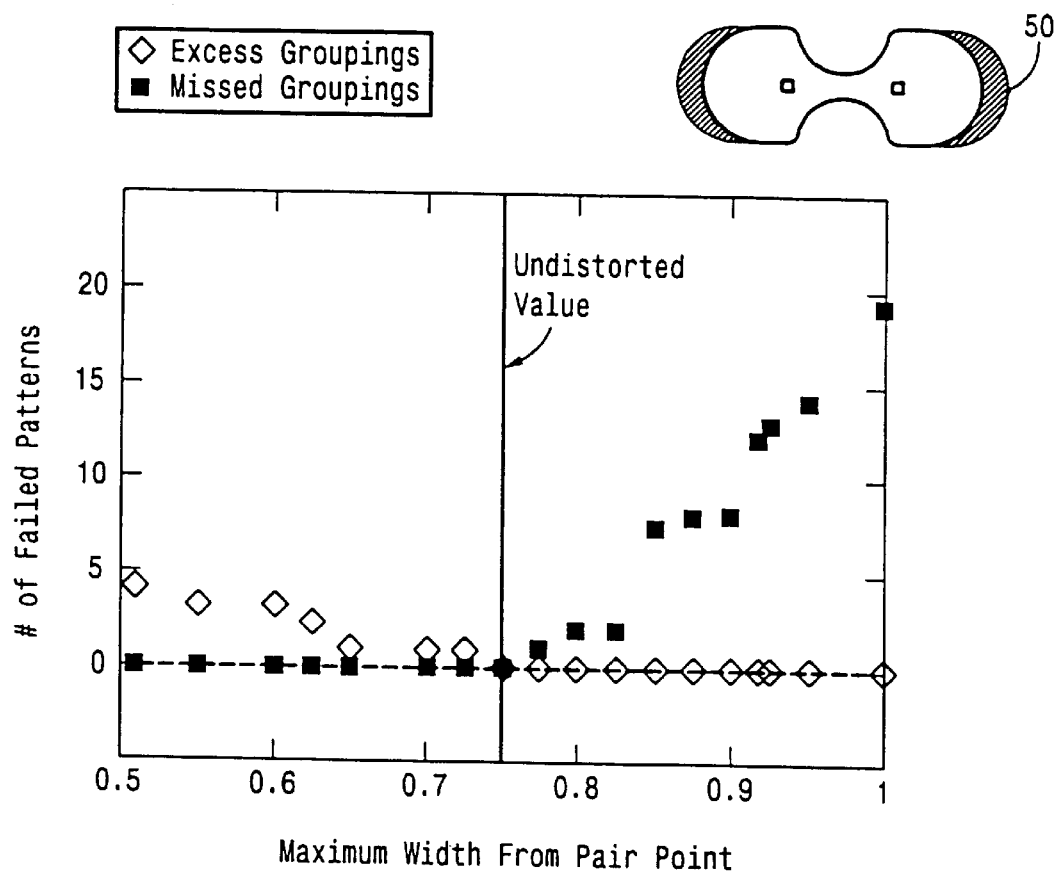
FIG. 11 is an illustration and a graph showing outer extension of the Rubel template and clustering results thereof.

The sensitivity of the template 20 along axis 24 is illustrated in FIG. 10. FIG. 10 illustrates the template distortion when points 48 and 50 are moved along the axis 24. The preferred performance range of the template is somewhat more limited, and is approximately 1.375 to 1.4 template units from the [0,0] point. And, FIG. 11 examines how much the ends 50 of the rounded region of influence of the template of FIG. 6 can be varied, approximately 0.05 template units.

Figure 7:
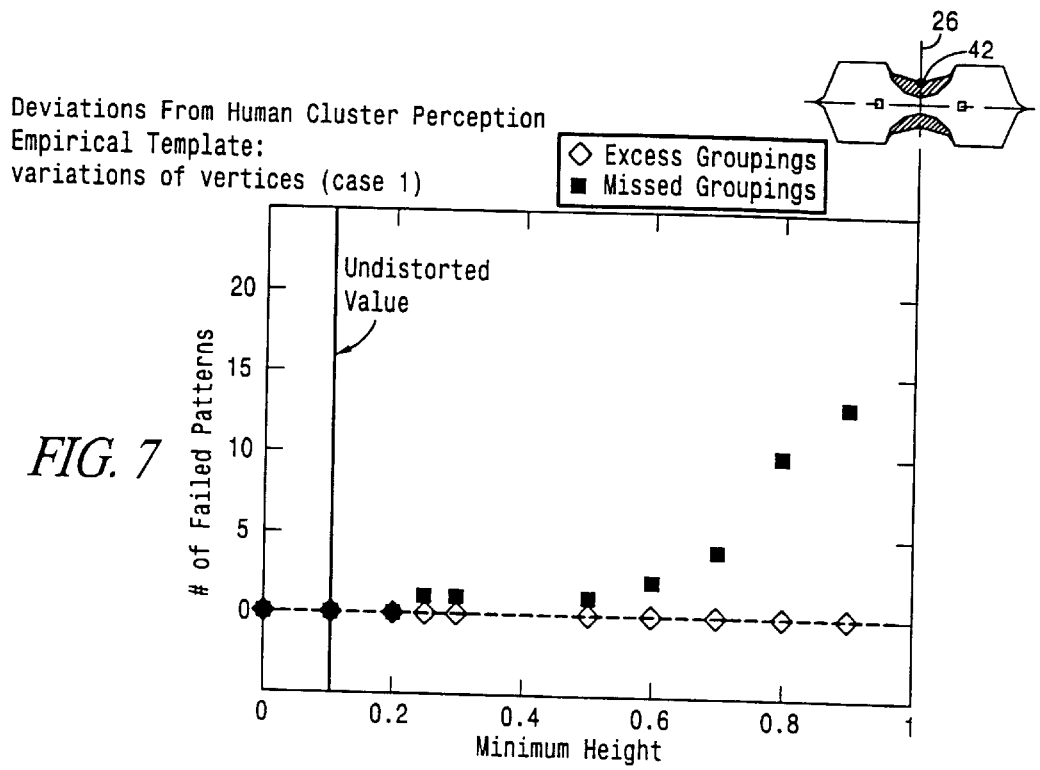
FIG. 7 is an illustration and a graph showing concavity distortion of the template and clustering results thereof.

Tables 7–11 actually tabulate the clustering results shown in FIGS. 7–11 for the regions of influence in terms of the success or failure of each test pattern, wherein Table 7 correlates with FIG. 7, Table 8 corresponds with FIG. 8, and so on. Each individual test pattern is labeled in accordance with the figures and the columns indicate a variation of particular distortion in template units. There are two types of failures that can occur for a given pattern. The region of influence can cause points from different clusters to erroneously be grouped together, referred to as an "excess grouping" or "+" in the tables. The region of influence can also leave points isolated from clusters to which they actually belong, referred to as a "missed grouping" and the symbol "−" in the tables. As can be seen from these results, there are ranges of distortions which produce no errors in the entire data set. Those columns with no symbols indicate that a particular template variation within that range actually clustered all of the patterns whereas outside of these ranges, the number of errors monotonically increase. The successful template shapes described herein can be directly used for clustering studies. However, a template having boundaries which exceed the optimum clustering ranges also may be used when a particular error range for particular applications is acceptable. This could occur, for example, if the cluster shapes which were not correctly produced by the template were known not to exist in the data to be examined.

The successful regions of influence revealed by these results differ from previously considered regions of influence in two important ways. First, as shown in FIG. 7 and Table 7, the region 28 "between" the point pair can be thin, i.e., the height of point 42 above and below the axis is smaller, compared to the rest of the region shape. Prior art regions of influences or templates typically have maximal thickness in this part of the region. Second, the range of allowable variation of the template is much larger along the direction perpendicular to the point pair, about 0.2 template units, than along the direction of the point pair, about 0.05, illustrated in FIGS. 10 and 11 and Tables 10 and 11. Thus, the region of influence boundary must be most carefully and correctly specified along the direction of the point pair to obtain good cluster results. Finally, as the size of a region of influence increases, the likelihood of finding an inhibitor point increases and the likelihood of obtaining missed grouping errors increases. For patterns with more than one cluster, as the area of a region of influence approaches zero, the likelihood of finding an inhibitor point becomes small and the likelihood of obtaining extra grouping errors increases.

The template and method were tested on complex digitized data patterns selected from the literature. The choice of patterns provided a wide variety of distinct cluster types and shapes and yet balanced the computational burden required to examine the full set. The twenty two patterns selected illustrate a variety of visually "obvious" clusters which, as a group, can't be described by a simple definition. We examined clustering results produced by various template shapes, and empirically adjusted the shape until the best cluster results were obtained. The dimensions of the regions of influence or templates are all defined in units of the spacing of the point pair spacing. The positions of the data points relative to the region of influence boundaries are indicated by open squares in the figures. While the most general version of the method has a template shape and size which varies with the positions, orientations or separations of the data pairs, a single fixed template shape is sufficient if the size and orientation are scaled to match each pair of data points. Point pair intensities and sizes also affect computer vision applications, but we assumed that all dots or points are the same size and contrast.

Figure 14:
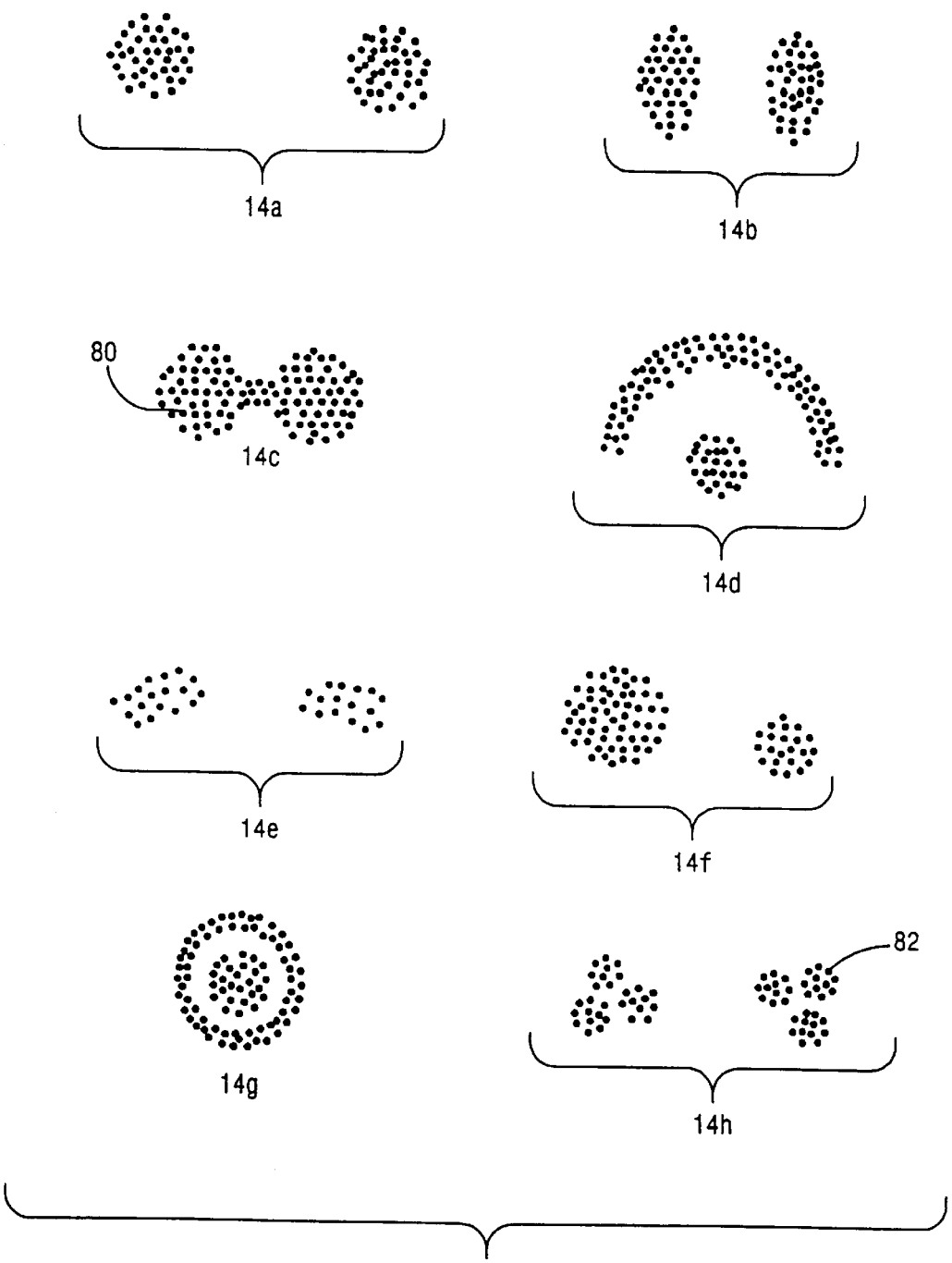
FIG. 14 depicts another set of eight test clusters.
Figure 17:
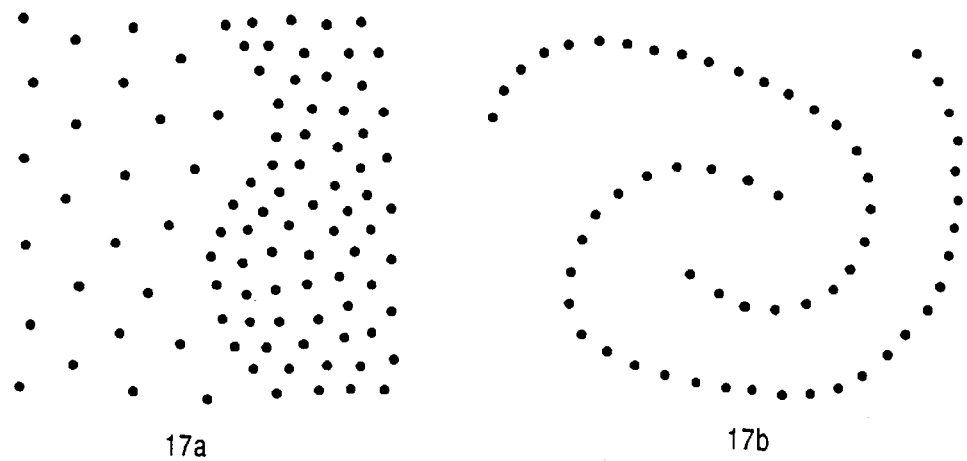
FIG. 17 presents additional clusters for testing direction and density of clustered data.
Figure 17:
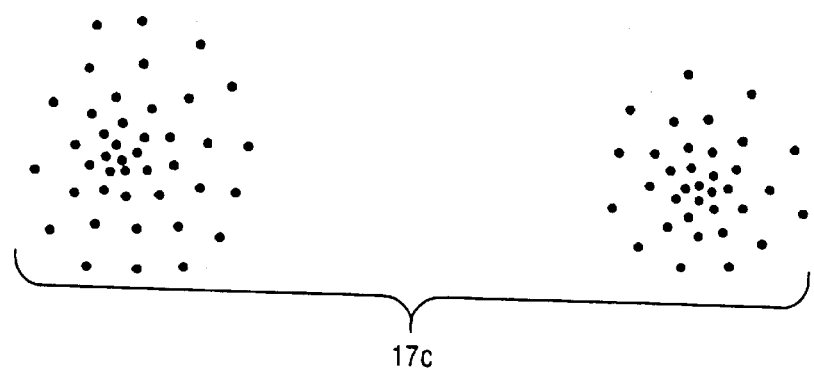
Figure 17:
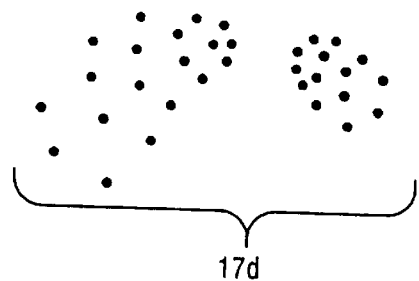

The first set of patterns, shown in FIG. 12 were presented by M. Wertheimer, *Laws of Organization in Perceptual Form* in *A Source Book of Gestalt Psychology*, W. Ellis (ed.), Routledger and Kegantters Paul (1938) as the first and most famous point patterns used to illustrate visual Gestalt cluster perception. The second set of patterns is from Jain, A. K., Chapter 2, *Cluster Analysis* from *Handbook of Pattern Recognition and Image Processing*, Academic Press, Inc., pp. 33–57, (1986), and is shown in FIG. 14; Jain asserted that no single existing grouping approach can successfully group all of the patterns. Another set, shown in FIG. 17, is selected from Zahn, C. T. *Graph-theoretical Methods for Detecting and Describing Clusters*, C20 IEEE TRANS. ON COMPUTERS (No. 1) 68 (1971). The cluster patterns of FIG. 17 represent patterns that are different in density, linear and intertwined, Gaussian, and nonhomogeneous. The results of clustering patterns of FIG. 17 (a) and (b) are shown in FIG. 18.

Figure 19:
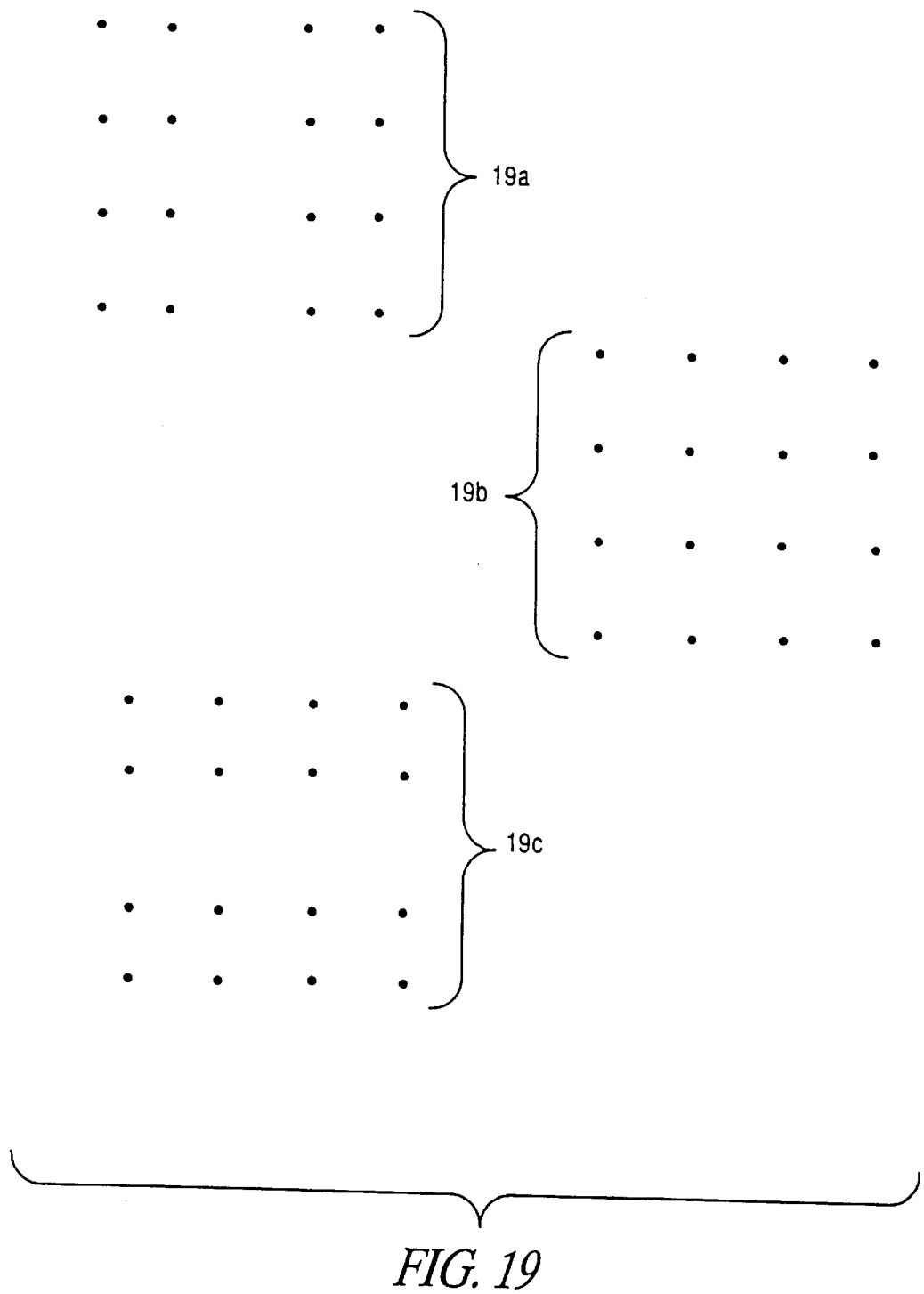
FIG. 19 illustrates the transition from column clusters to a single array cluster to row clusters as spacings between points are altered.
Figure 20:
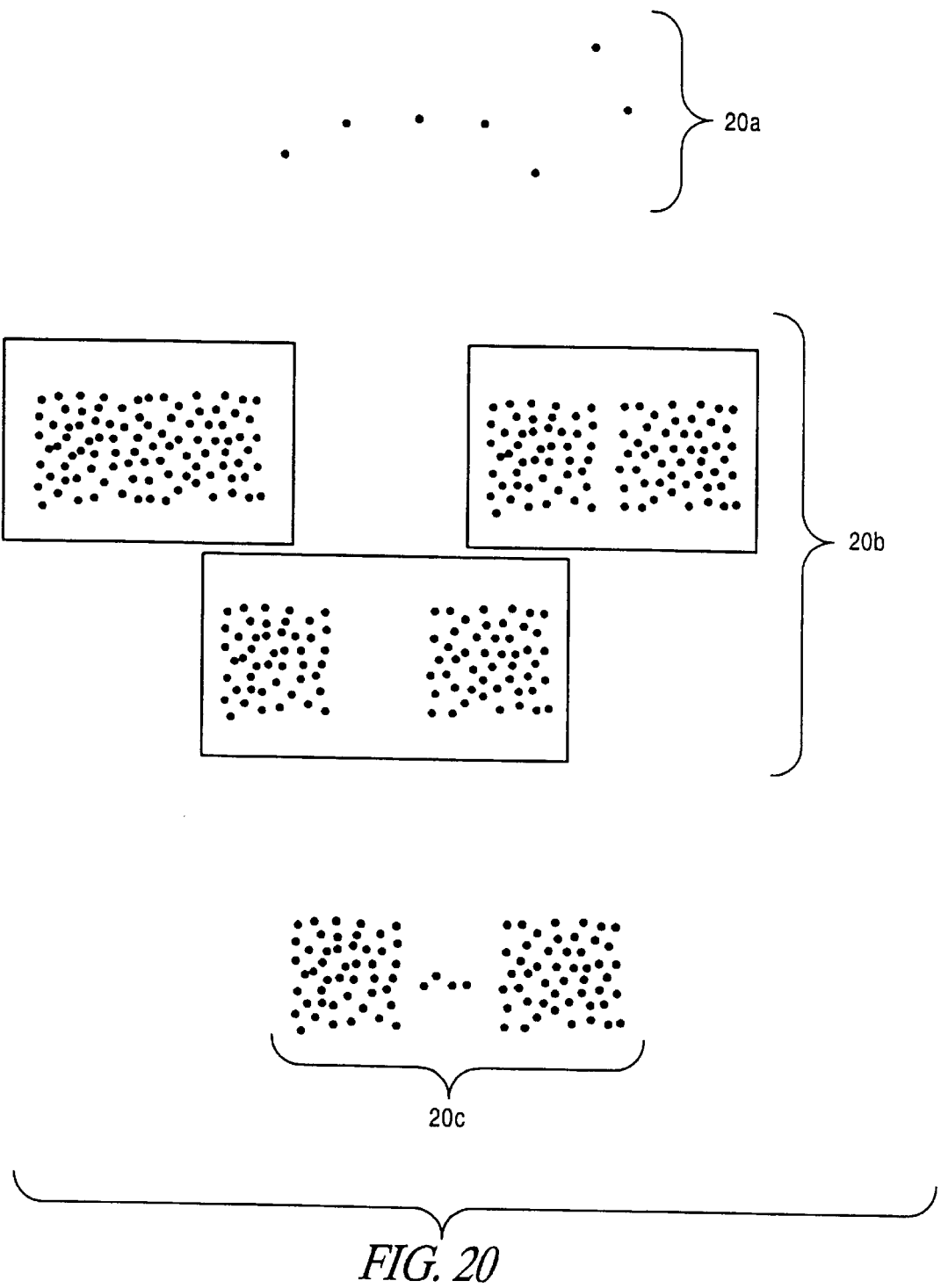
FIG. 20 show yet additional clusters: a Big Dipper; the mergence of two clusters into a single cluster; and yet another pair of clusters with a thin thread of "noise" data points between them.

The patterns of FIG. 19 represent the transition from column clusters to a single array cluster to row clusters as certain horizontal and vertical point spacings of an array are altered. These patterns have been used in several studies of visual Gestalt cluster perception. And the patterns of FIG. 20 were created by the inventors; one of which, FIG. 20(a) represents the Big Dipper. The cluster of FIG. 20(b) represents the merging of two clusters into a single cluster as the separation between the two is made small, and actually there are five clusters in the pattern. The last pattern contains two large clusters with another small "chain" cluster of points between them. Altogether, there are three clusters in this pattern.

Figure 15:
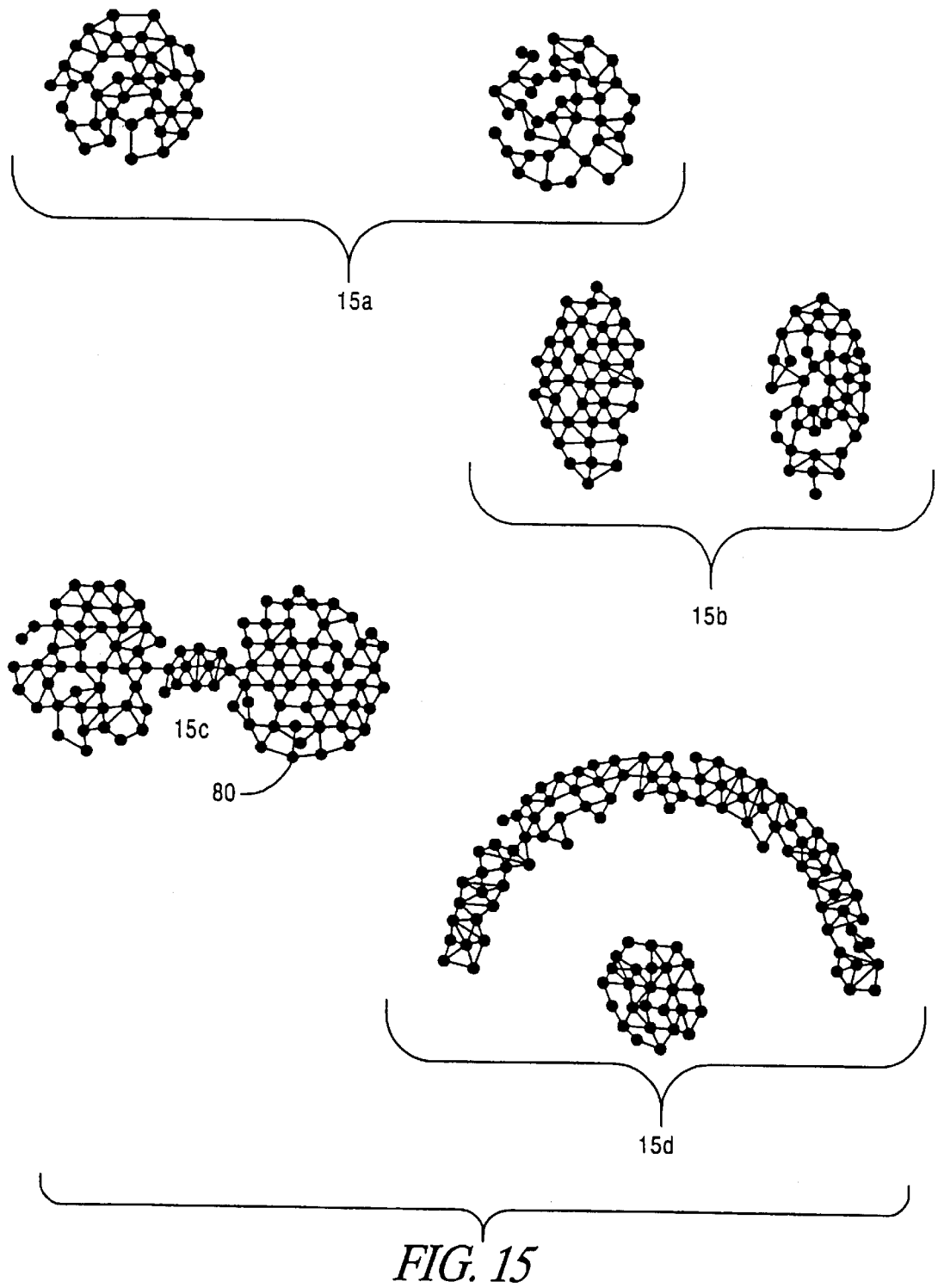
FIGS. 15 and 16 present the test clusters of FIG. 14 as grouped by the clustering method of the invention.
Figure 16:
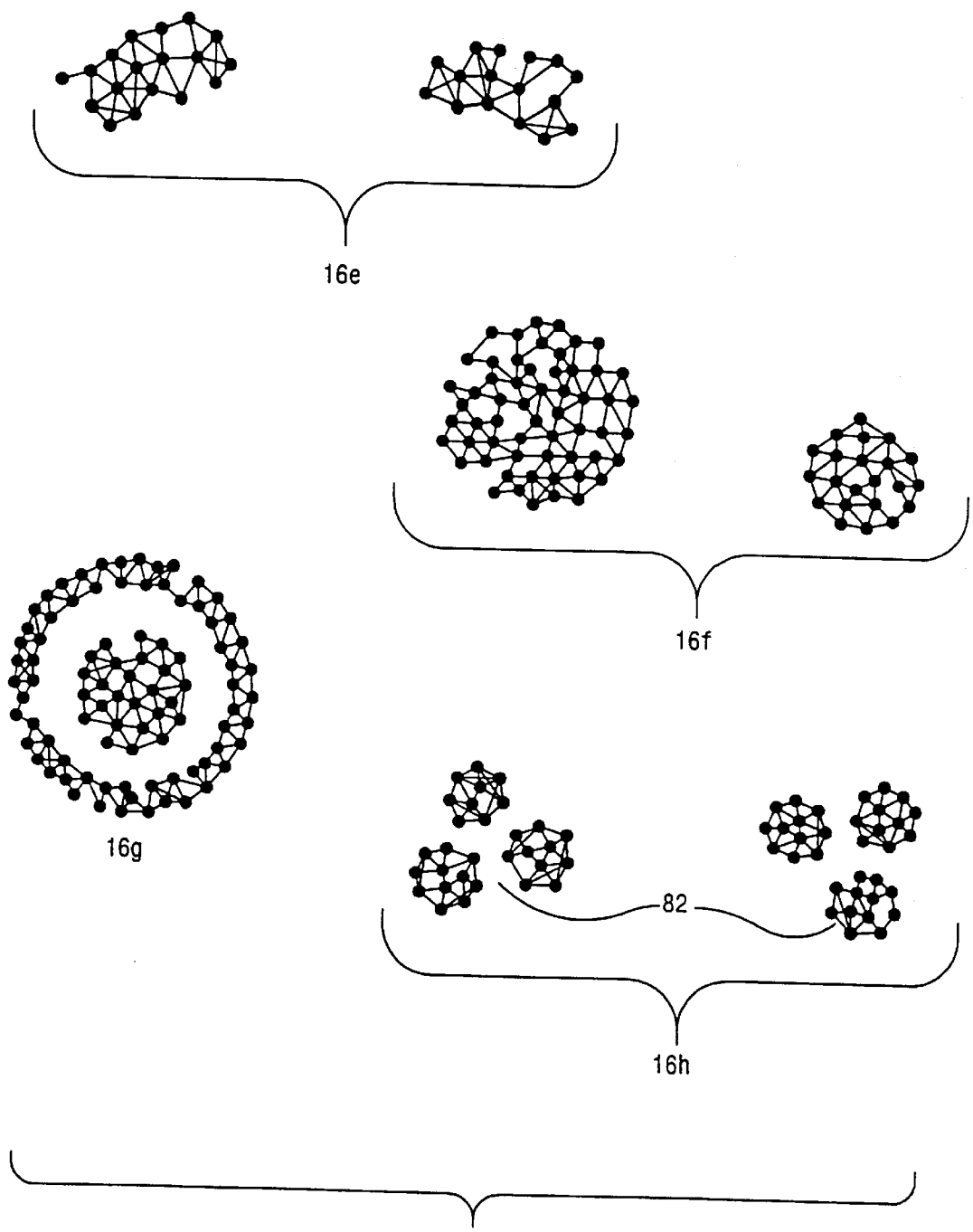
Figure 18:
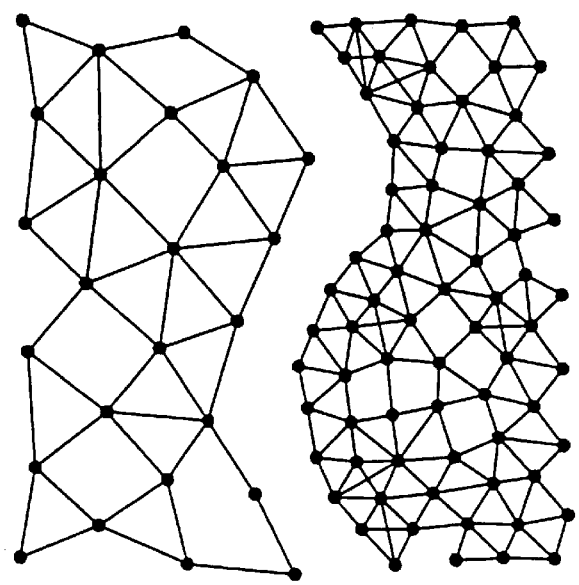
FIG. 18 presents the grouping of the additional clusters shown in FIG. 17 by the clustering method of the invention.
Figure 18:
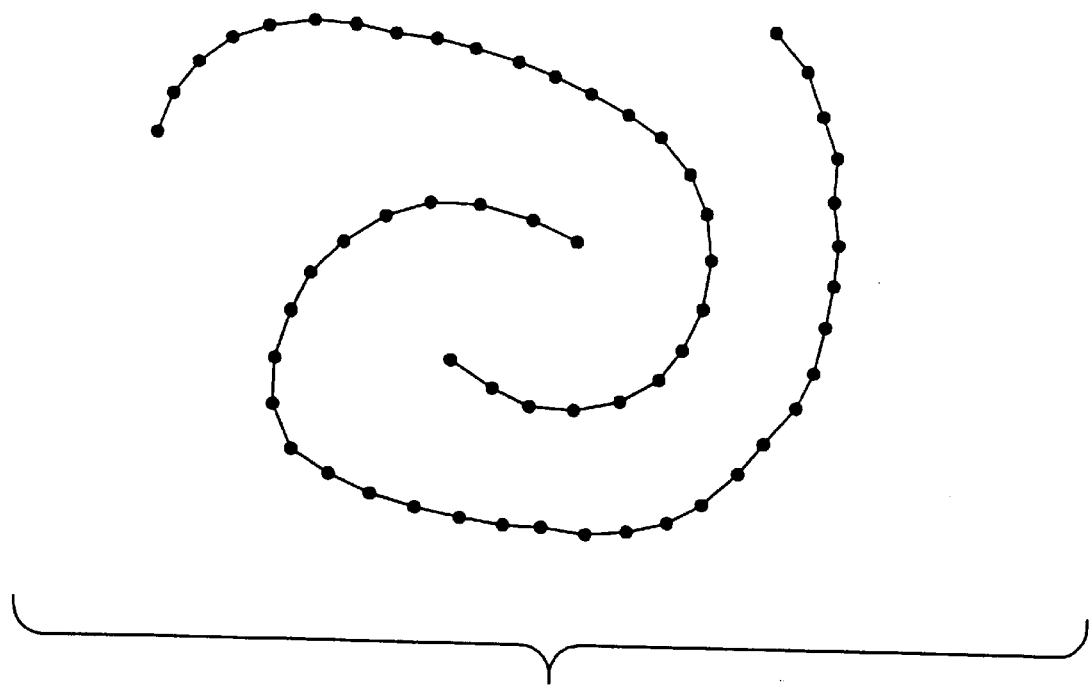

The pairs of data points which are grouped with use of the template are so indicated by connecting them with a solid line in FIGS. 13, 15, 16, and 18. The resulting clusters are those sets of points which are directly or indirectly connected by solid lines. FIG. 13 demonstrates that the present approach is consistent with the principle of proximity as represented by the simple dot patterns of FIG. 12. FIGS. 15 and 16 give the individual results of the eight patterns in FIG. 14. Jain described all of these patterns as having two clusters. Six of the eight patterns produce two calculated clusters in agreement with the visual appearance of these patterns. However, the "dogbone" pattern denoted as 80 in FIGS. 14 and 15 and the "clusters-within-clusters" pattern 82 in FIGS. 14 and 16 do not produce two clusters. A single cluster is produced for the "dogbone" pattern 80 rather than two "touching" clusters. It may be that the single cluster is in fact the correct clustering result based on human perceptions. The interpretation of this single cluster as possibly resulting from two overlapping clusters might justifiably follow from the concavities of the single cluster boundary or from additional data associated with each dot, e.g., the known class of the dot in a pattern recognition study. The "clusters-within-clusters" pattern 82 produces six clusters. Again, this result is actually consistent with the pattern as the reader can verify by inspection. However, it is also possible to perceive these six clusters as being further grouped into two sets of three each. This grouping result can be obtained directly from the present model if the six circular clusters are themselves treated as dots and the template calculations are carried out again on the average positions of these cluster "dots." Finally, FIG. 18 gives the results for the patterns of FIG. 17(a) and (b). FIG. 18 shows the two regions of different dot density can be successfully segmented by the grouping algorithm. FIG. 18 shows further that clusters consisting of extended curves can also be successfully obtained from the model. With the debatable exception of the "dogbone" pattern 80 of FIGS. 14 and 15, the results for all fourteen dot patterns demonstrate that the model successfully groups a variety of complex dot patterns.

Figure 21:
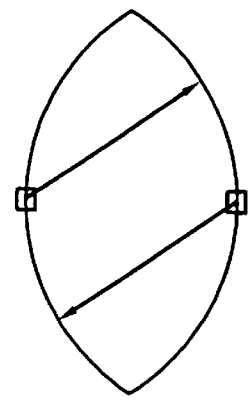
FIG. 21 illustrate prior art regions of influences or templates.
Figure 21:
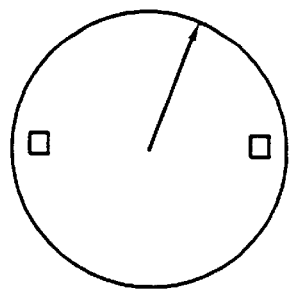
Figure 21:
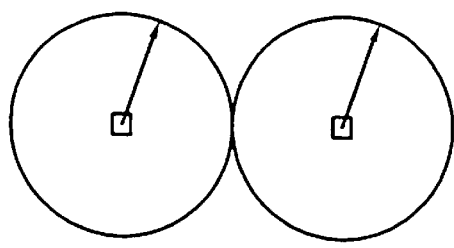
Figure 21:
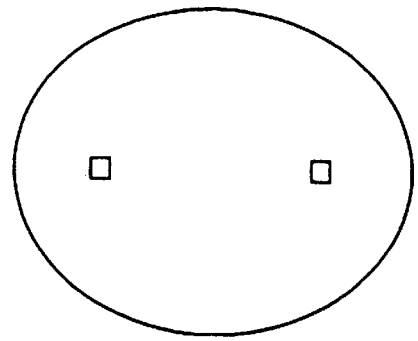
Figure 22:
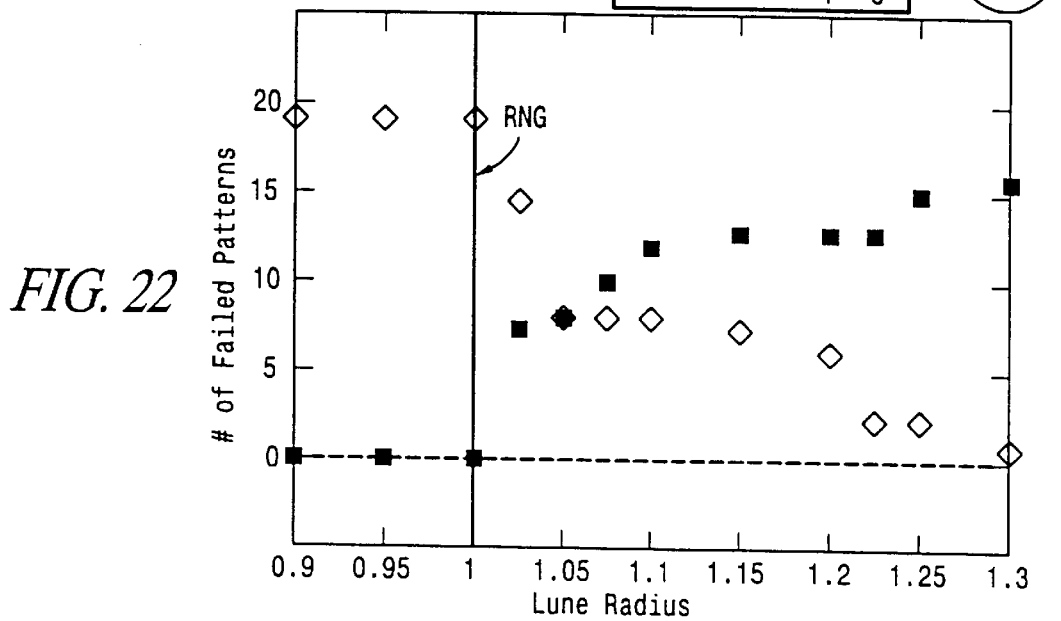
FIG. 22 is an illustration and a graph of a lune template of FIG. 21 (a) showing lune radius distortion of the template and clustering results thereof.
Figure 23:
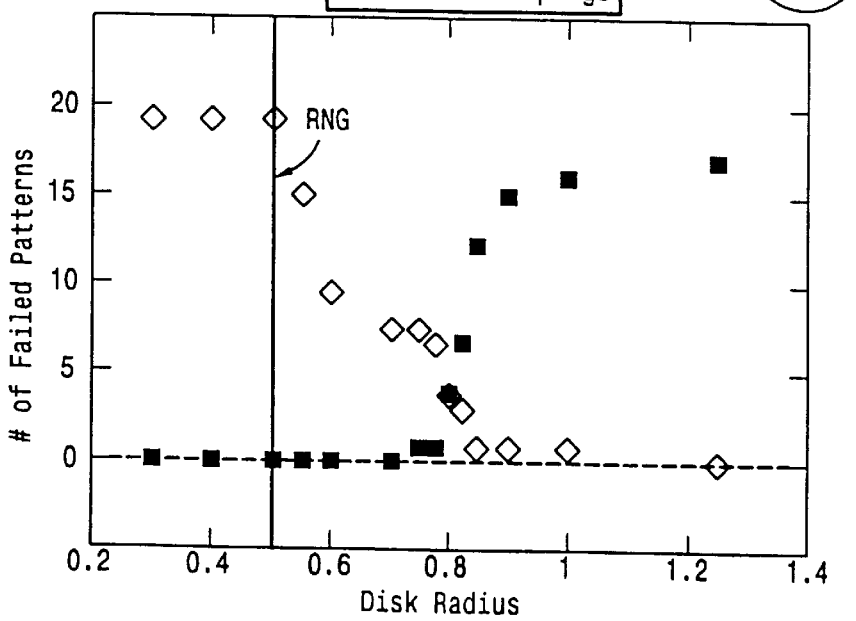
FIG. 23 is an illustration and a graph of a disk template of FIG. 21 (b) showing radius distortion of the template and clustering results thereof.
Figure 24:
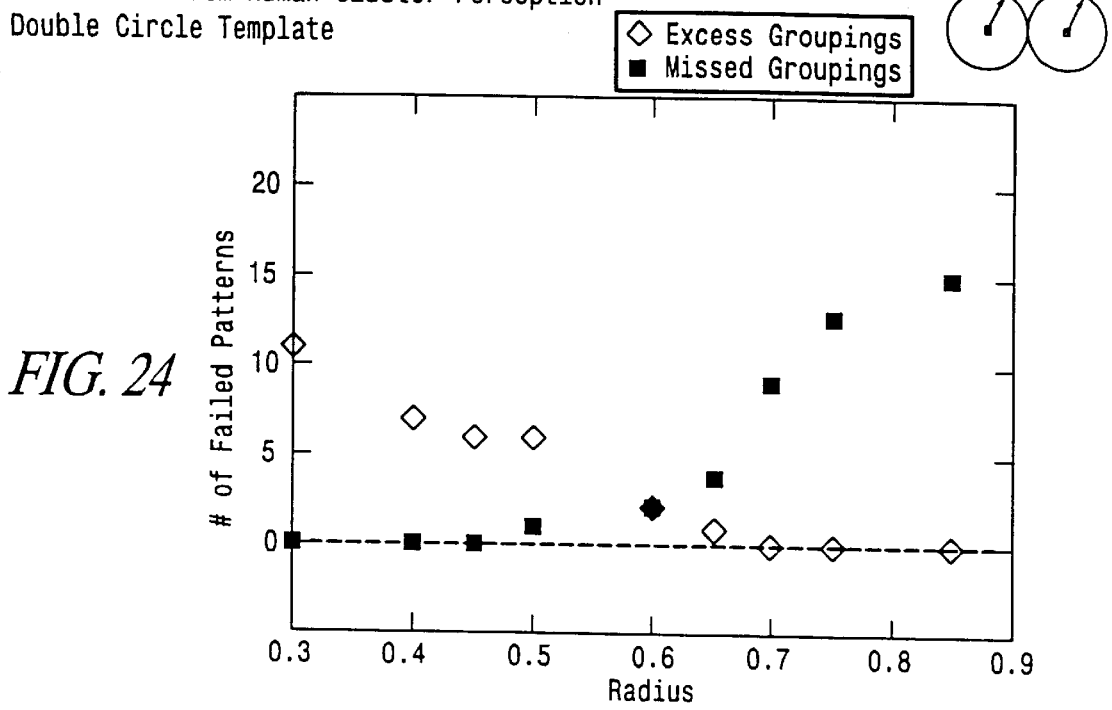
FIG. 24 is an illustration and a graph of a double circle template of FIG. 21 (c) showing inner radius distortion of the template and clustering results thereof.
Figure 25:
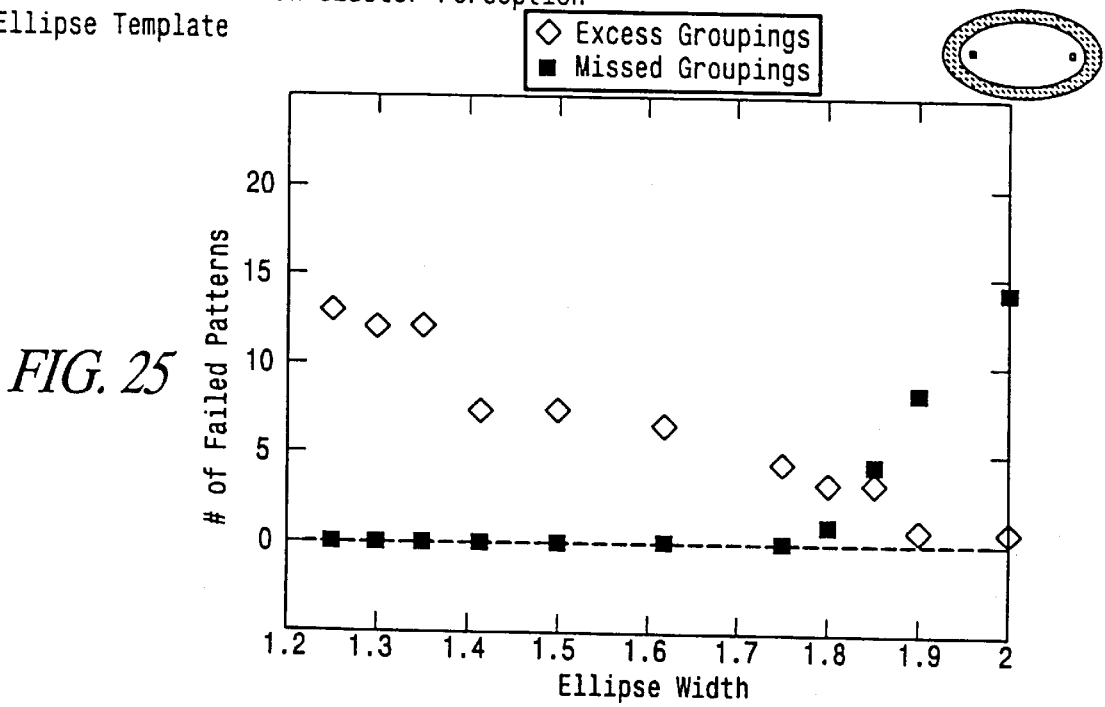
FIG. 25 is an illustration and a graph of a elliptical template of FIG. 21 (d) showing ellipse width distortion of the template and clustering results thereof.

A wide variety of prior art template shapes shown in FIG. 21 are not capable of producing the full set of two dimensional clusters of the test data of FIGS. 12, 14, 17, 19, and 20. Tables 22–25 correlate tabulated results when the test patterns of FIGS. 12, 14, 17, 19, and 20 are tested with prior art templates or regions of influence illustrated in FIG. 21. For the lune illustrated in FIG. 21(a), the results are tabulated in Table 22 and graphically represented in FIG. 22 with the lune radius R treated as a variable wherein R=1 corresponds to the Relative Neighbor graph. The results using the disk template of FIG. 21(b) are presented in Table 23 and FIG. 23 with the radius R of the disk template treated as a variable wherein R=1 corresponding to the Gabriel graph case. FIG. 21(c) shows another type of region having two disks with variable radius R with the variation of R in clustering the test data illustrated in FIG. 24 and presented in Table 24. Lastly, Table 25 and FIG. 25 show the results of the variable size elliptical template using test data of a template shown in FIG. 21(d) by Krivanek, M. in *The Use of Graphs of Elliptic Influence in Visual Hierarchical Clustering,* 452 LECTURE NOTES IN COMPUTER SCIENCE 392 (1990). As can be seen from the tabulations, no parameter value can be found which simultaneously avoids extra grouping errors and missed grouping errors for any of these prior art generalized regions of influence. The results also show what parameters will minimize such errors, if these unsuccessful regions were to be used for clustering analysis.

Figure 26:
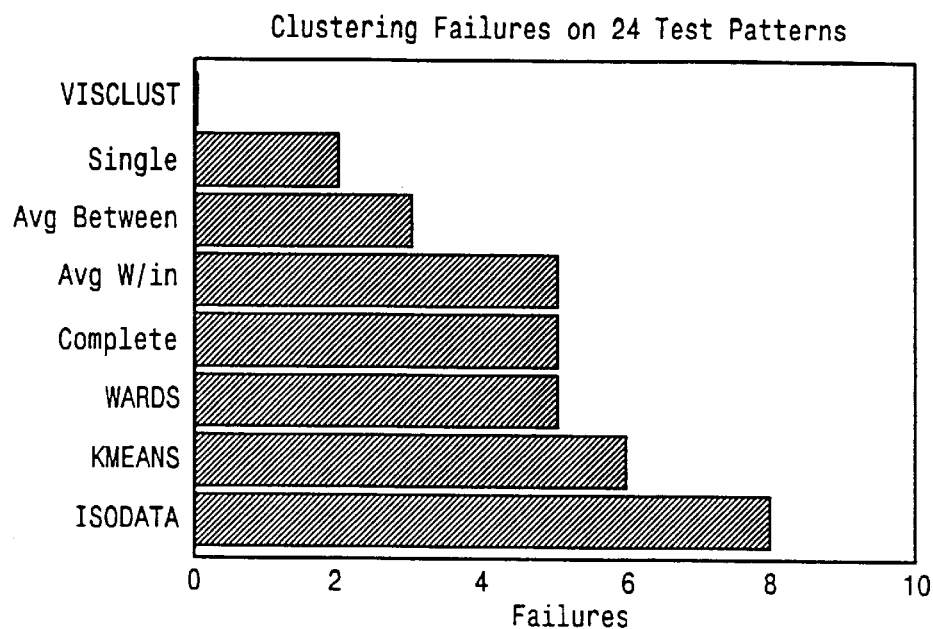
FIG. 26 is a histogram of comparison tests between the clustering method of the invention and other prior art clustering techniques.

The twenty-two test patterns of FIGS. 12, 14, 17, 19 and 20 were examined with a set of standard clustering routines contained in the OLPARS and IMSL commercial packages and the results are shown in FIG. 26. Two types of algorithms were used, partitioning and agglomerative hierarchical. Recall that the clustering result of a partitioning algorithm is a single division of the data set into K clusters, where K is user-specified; whereas agglomerative hierarchical algorithms iteratively build clusters from the individual data points until the user-specified number of clusters is found.

The partitioning algorithms used were ISODATA from OLPARS and K-means from the IMSL libraries. ISODATA and K-means use K initial values for cluster means and classify data points by assigning them to the closest mean value. The means are recomputed as the average of the points in the same class and points are reassigned to the class with the closest means until no further point reassignments occur. ISODATA computes its own starting mean values. The K-means algorithm requires K starting or seed mean points as input. A seed point is an initial guess of a mean position value of one of the clusters; and of course, different seed points may result in different cluster results. Two different schemes were tried for choosing seeds. The first K data points were used as seeds in one set of cluster runs, and in the second set of cluster runs, seed points which approximately occurred in the separate clusters of the data were used. Knowing that the data in the clusters were digitized one cluster at a time in an order where all digitized points were contiguous, every N/K point was used as a seed, where N is the number of points in the data set. Note that this information about clusters and seeds is not known in the general clustering case.

The hierarchical algorithms differ mainly in the criterion functions used for combining clusters. The agglomerative hierarchical algorithms used were single, complete, average, and Ward's linkage from the IMSL libraries. "Single linkage" uses the minimum distance between two clusters. "Complete linkage" uses maximum distance between clusters. "Average distance within clusters" method uses average distance between all points in the potentially merging clusters. "Average distance between clusters" method uses average distance between points in one of the clusters and points in the other. Ward's method minimizes the within-cluster sum of squares of two potentially merging clusters.

All of the existing prior art methods used in the study required as input the number of clusters to be found. Moreover, most of the methods cannot cluster if there really is only one cluster. None of the prior art clustering methods successfully clustered all the test patterns. In contrast, not only did the invention using the template and the method described herein successfully cluster all the test patterns without requiring any other input besides the data point, it also output the actual number of clusters.

Figure 27:
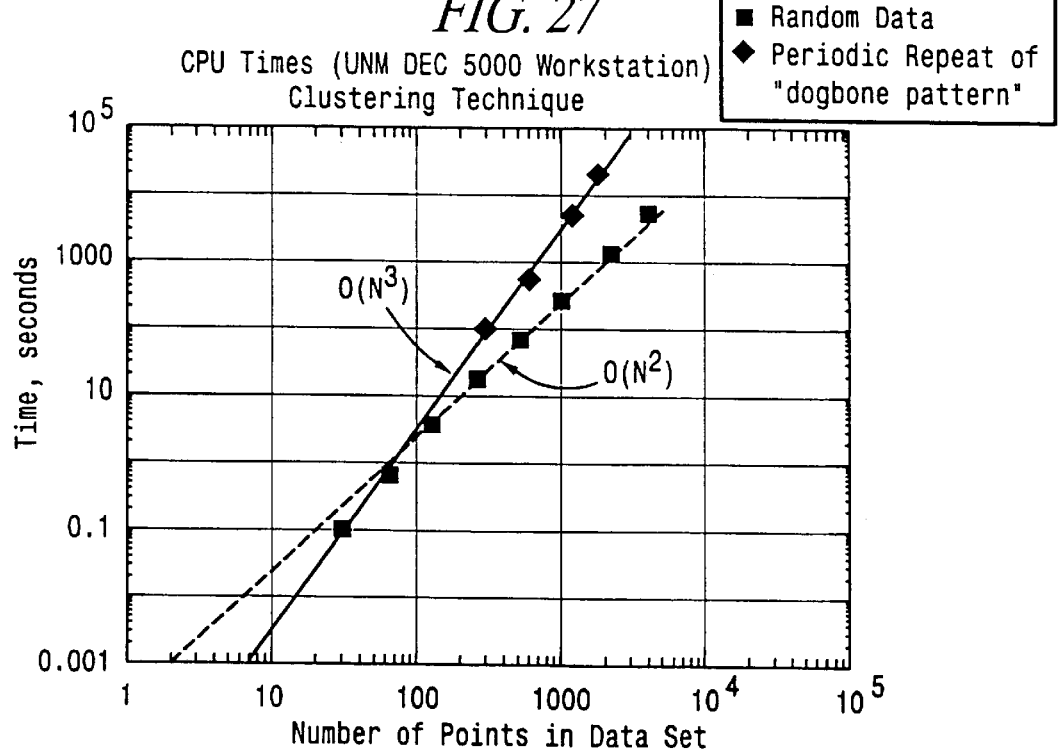
FIG. 27 is a graph of the computational time as a function of the number of test data points of the clustering method of the invention.

The applicability of the method to very large data sets appeared to be limited by the $O[N^3]$ computational times, where N is the number of data points. This relationship is set forth in FIG. 27. But, in fact, an $O[N^2]$ exact method of clustering has been developed. This method relies on a proof that each data point groups with a fixed maximum of other points in the data set. The method uses a fixed number of nearest neighbors of each grouping point as inhibitor candidates. Optimally three nearest neighbors need only be considered, but any fixed number of nearest neighbors greater than zero will suffice. These neighbors of a point have a high probability of being inhibitors of groupings of a point. A fixed number of nearest neighbors to each data point can be found in $O[N^2]$ time. Using the nearest neighbor inhibitor candidates, a set of approximate grouping results can be found in $O[N^2]$ time. These groupings are a superset of groupings where all the required exact groupings as well as some excess groupings may occur. The exact grouping results then can be filtered from the approximate groupings using all the other points in the data set as inhibitor candidates in each of the approximate grouping results. Filtering the exact groupings is an $O[N^2]$ process, therefore this method of clustering is bounded by $O[N^2]$ processes resulting in an $O[N^2]$ algorithm.

Figure 28:
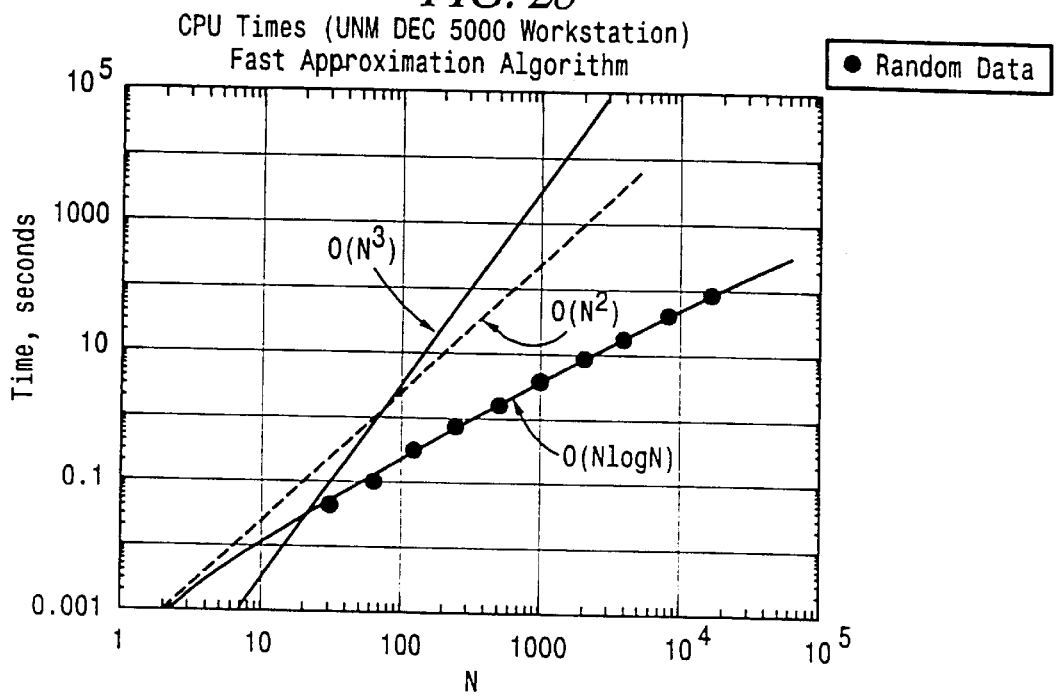
FIG. 28 is a graph of the computational time as a function of the number of test data points of the fast approximation clustering method of the invention.

As noted above, except for a few percentage of data points, nearly all points group with only a few close neighbors, and it is this observation that facilitates other approximation techniques. Thus, the search for potential groupers of each point can be limited to a few close neighbors which yields template examinations that scale as N. When approximate techniques are used to find the closest neighbors, for example, using Voronoi neighbors instead of true nearest neighbors, the method obtains approximate nearest neighbors in computations proportional to NlogN for two dimensional data. For higher dimensional data the computations required scale by a dependence greater than NlogN, and may be worse than $O[N^2]$. This approach, combined with the limited grouper and neighbor searches wherein the computations are proportional to N, gives a full computation that scales like $O[NlogN]$ in two dimensions. A set of computation times as a function of number of data points using this Voronoi neighbor approach is shown in FIG. 28. The cluster results demonstrate the NlogN scaling of the computational times, and the cluster results obtained there match the correct results. However, in general, such approximate results may not always match the exact results.

The template shapes and the method described herein can be naturally extended to data having dimensions greater than two because the data points are examined in groups of three, i.e., a pair of potential grouper points and a potential inhibitor point. Because a two dimensional hyperplane can always be found which contains three points of arbitrary dimensionality, the method and template herein is applied to all sets of three points in the two dimensional hyperplanes in which they lie.

The method is very useful to develop classification schemes, which can then be used in pattern recognition. Pattern recognition techniques use examples of data from patterns that are already recognized, called training set data, to guess the identity of new acquired data, called test set data. Such data is derived from an enormous variety of problems, including identifying hazardous chemical in complex environments and classification of image features for satellite or biomedical applications. Many alternative pattern recognition techniques exist, but none perform in a way that competes with human visual perception. Thus, improvements over existing pattern recognition performance are needed to adequately address many existing applications.

A pattern recognition technique is directly obtainable from the template in which the data points represent measured information. First, the training data set is clustered with the template using the method described herein. In fact, the quality of the training data can be evaluated with this method. If groupings or classes of data are not clearly distinguishable, the validity of the training data may be questionable. Assuming, however, that the training data is clustered successfully, the individual test data points then are considered with the training data and clusterings to the test point are computed using the empirical template method. A test point is assigned to the class or classes of the training data points with which it clusters. Test points which group with points from a single class are unambiguously assigned that class value. Test points that cluster either with training points from more than one class or that cluster with no training points so that no class seems appropriate are also identified. The pattern recognition method herein mimics human performance and provides several qualitative performance capabilities unavailable for existing methods.

Figure 29:
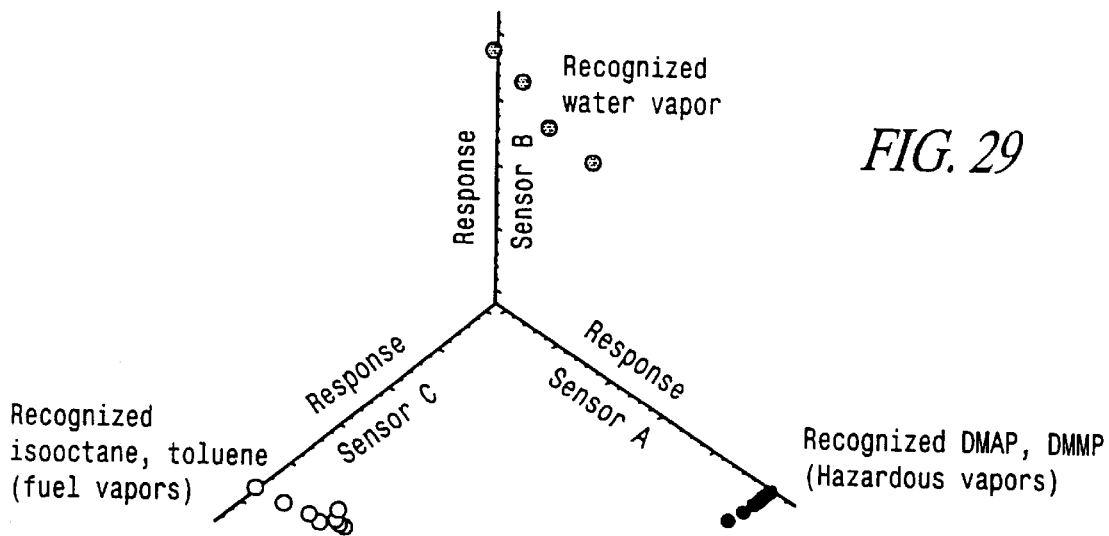
FIG. 29 illustrates the detection of multiple chemical species with multiple chemical sensors using the pattern recognition method of the invention herein.

FIG. 29 illustrates the clustering template and the pattern recognition method herein to chemical sensor data of Table 29. The data of Table 29 represents several coatings of a surface acoustic wave (SAW) chemical sensor detecting various concentrations of various vapors. FIG. 29 illustrates the responses or frequency shifts of three chemical sensors to two hazardous chemicals and three background chemicals. Typically, the responses of individual chemical sensors are not sufficiently specific to provide chemical recognition, pattern recognition of multiple sensor signals makes automated chemical recognition possible. Thus, the multidimensional feature of the method becomes apparent wherein the dimensions may be representative of any measurable physical parameters of a class, e.g., viscosity, density, molecular weight, absorbance, frequency, optical intensity, gray levels, etc.

Figure 30:
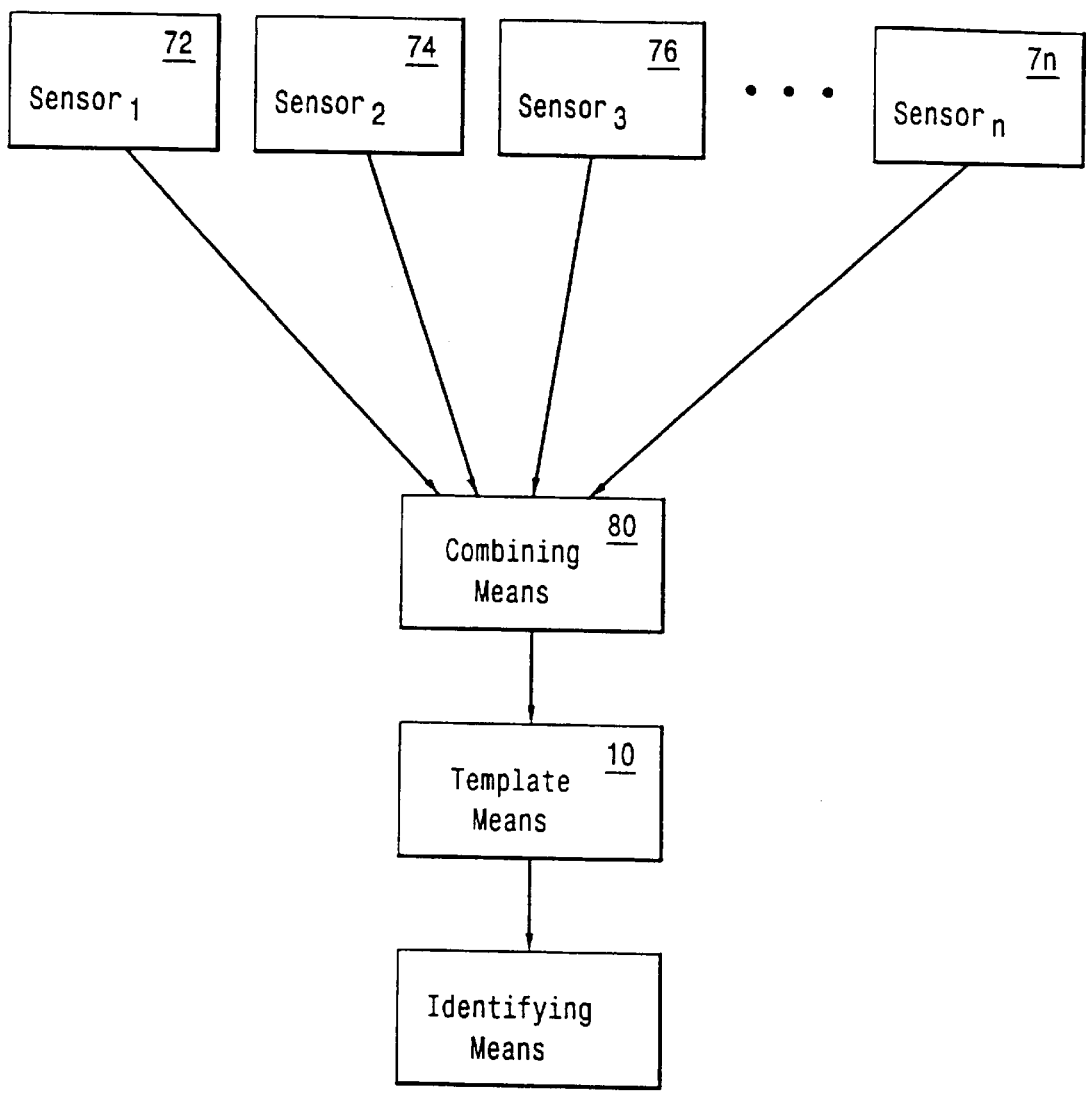
FIG. 30 illustrates a block diagram of the processing of data according to the invention.

As illustrated in FIG. 30, the outputs of a plurality of sensors 72, 74, ..., 7n are combined to form data points by combining means 80 from where they are evaluated by template 10 with test points that have been clustered as discussed above. Any data point that clusters with a cluster of points is identified by identifying means 90 as being a member of that cluster.

Although the invention has been described as a clustering method and template and as a pattern recognition method, it will be appreciated that distortion of the template beyond the boundaries shown in the template of FIG. 1 is also embodied in the description. If certain ranges of errors are acceptable, or for instance, if certain types of cluster types are known to be excluded from the data, then the boundaries of the clustering template may exceed the maximum outer boundary or may fall short of the minimum outer boundaries of the template described herein. Moreover, if it is known that certain data points will cluster only with specific neighbors, the time required for clustering can be substantially reduced by limiting the clustering to only those neighbors. The data need not be two dimensional data, but may be multidimensional. Likewise, chemical sensor identification is not the only application of the pattern recognition technique described herein.

TABLE 7

Good template with central height distortion

| | | | | | |
|---|---|---|---|---|---|
| 14a | – | – | – | – | – |
| 14b | | – | – | – | – |
| 14c | | | – | – | – |
| 14d | | – | – | – | – |
| 14e | | | | – | – |
| 14f | | | | | – |
| 14g | | | – | – | |
| 14h | | | | – | – |
| 17a | | | – | – | – |
| 17b | | | | | |
| 17c | – | – | – | – | |
| 17d | | | – | – | |
| 12a | | | | | |
| 12b | | | | | |
| 12c | | | | | |
| 12d | | | | | |
| 19a | | | | | |
| 19b | | | | | |
| 19c | | | | | |
| 20a | | | | | |
| 20b | | | | | – |
| 20c | | | | | – |

TABLE 8

Good template with inner height distortion

| | | | | | |
|---|---|---|---|---|---|
| 14a | – | – | – | – | – |
| 14b | | – | – | – | – |
| 14c | | | – | – | – |
| 14d | | – | – | – | – |
| 14e | | | | – | – |
| 14f | – | – | – | – | – |

TABLE 8-continued

Good template with inner height distortion

| | | | | | | | | |
|---|---|---|---|---|---|---|---|---|
| 14g | | | | | − | − | − | |
| 14h | | | | | | | − | |
| 17a | | | | | | − | − | |
| 17b | + | | | | | | | |
| 17c | | | | − | − | − | − | |
| 17d | | − | − | − | − | − | − | |
| 12a | + | | | | | | | |
| 12b | | | | | | | | |
| 12c | | | | | | | | |
| 12d | | | | | | | | |
| 19a | | | | | | | | |
| 19b | | | | | | − | | |
| 19c | | | | | | | | |
| 20a | | | | | − | − | | |
| 20b | − | − | − | − | − | − | | |
| 20c | | − | − | − | − | − | | |

TABLE 9

Good template with outer height disortion

| | | | | | | | | |
|---|---|---|---|---|---|---|---|---|
| 14a | | | | | − | − | − | − |
| 14b | | | | | | − | − | − |
| 14c | | | | | − | − | − | − |
| 14d | | | | | − | − | − | − |
| 14e | | | | | | | | − |
| 14f | | | | | | | | − |
| 14g | + | | | − | − | − | − | − |
| 14h | + | + | + | | − | − | − | |
| 17a | + | + | + | | − | − | − | |
| 17b | | | | | | | | |
| 17c | | | | − | − | − | − | |
| 17d | | | | | | | − | |
| 12a | | | | | | | | |
| 12b | | | | | | | | |
| 12c | | | | | | | | |
| 12d | | | | | | | | |
| 19a | + | + | | | | | | |
| 19b | | | | | | | | |
| 19c | + | + | | | | | | |
| 20a | | | | | | | | |
| 20b | + | + | | − | − | − | − | |
| 20c | | | | − | − | − | − | |

TABLE 10

Good template width distortion

| | | | | | | | |
|---|---|---|---|---|---|---|---|
| 14a | | | | | | − | − |
| 14b | | − | − | − | − | − | |
| 14c | | | | − | − | − | − |
| 14d | | | | | − | − | − |
| 14e | | | | | | | − |
| 14f | | | | | | | − |
| 14g | | | | | | | − |
| 14h | + | | | | | | |
| 17a | | | | − | − | − | − |
| 17b | | | | | − | − | − |
| 17c | | | | | − | − | − |
| 17d | | − | − | − | − | − | − |
| 12a | | − | − | − | − | − | − |
| 12b | | − | − | − | − | − | − |
| 12c | | | | − | − | − | − |
| 12d | | | | − | − | − | − |
| 19a | | | | | | | |
| 19b | | | − | − | − | − | − |
| 19c | | | | | | | |
| 20a | | | | | − | − | − |
| 20b | | | | − | − | − | − |
| 20c | | | | − | − | − | − |

TABLE 11

Good "rounded" template with width distortion

| | | | | | | | | | |
|---|---|---|---|---|---|---|---|---|---|
| 14a | | | | | − | − | − | − | − |
| 14b | | | | − | − | − | − | − | − |
| 14c | | | | | − | − | − | − | − |
| 14d | | | | − | − | − | − | − | − |
| 14e | | | | | | | | | |
| 14f | | | | | | | − | − | − |
| 14g | + | + | | | | | − | − | − |
| 14h | + | + | + | + | | | | | |
| 17a | + | + | + | | | | − | − | − |
| 17b | | | | | | − | − | − | − |
| 17c | | | | | | | − | − | − |
| 17d | | | | − | − | − | − | − | − |
| 12a | | | | | | | | | − |
| 12b | | | | | | | | | − |
| 12c | | | | | | | | | − |
| 12d | | | | | | | | | − |
| 19a | | | | | | | | | |
| 19b | | | | | | | | | − |
| 19c | | | | | | | | | |
| 20a | | | | | | − | − | − | − |
| 20b | + | | | | − | − | − | − | − |
| 20c | | | | | − | − | − | − | − |

TABLE 22

Lune (RNG)

| | | | | | | | | | |
|---|---|---|---|---|---|---|---|---|---|
| 14a | + | − | − | − | − | − | − | − | − |
| 14b | + | + | − | − | − | − | − | − | − |
| 14c | + | | − | − | − | − | − | − | − |
| 14d | + | +− | − | − | − | − | − | − | − |
| 14e | + | + | | − | − | − | − | − | − |
| 14f | + | | | − | − | − | − | − | − |
| 14g | + | +− | +− | +− | +− | − | − | − | − |
| 14h | + | + | + | +− | +− | +− | +− | +− | +− |
| 17a | + | +− | +− | +− | +− | +− | +− | − | − |
| 17b | + | + | | | | | | | |
| 17c | + | − | − | − | − | − | − | − | − |
| 17d | + | | | − | − | − | − | − | − |
| 12a | + | + | | | | | | | |
| 12b | + | | | | | | | | |
| 12c | + | + | + | + | + | + | + | + | |
| 12d | + | + | | | | | | | |
| 19a | + | + | + | + | + | + | − | − | |
| 19b | | | | | | | | | |
| 19c | + | + | + | + | + | + | | | − |
| 20a | | | | | | | | − | − |
| 20b | + | +− | +− | +− | +− | +− | − | − | − |
| 20c | + | +− | +− | +− | +− | +− | +− | − | − |

TABLE 23

Disk (GG)

| | | | | | | | | | |
|---|---|---|---|---|---|---|---|---|---|
| 14a | + | | | | | − | − | − | − |
| 14b | + | | | | − | − | − | − | − |
| 14c | | | | | | | | − | − |
| 14d | + | + | | | | | − | − | − |
| 14e | + | + | | | | | − | − | − |
| 14f | + | | | | | | − | − | − |
| 14g | + | + | + | + | + | − | − | − | − |
| 14h | + | + | + | + | + | + | +− | +− | +− |
| 17a | + | + | + | + | + | − | − | − | − |
| 17b | + | + | | | | | | | |
| 17c | + | + | | | − | − | − | − | − |
| 17d | + | + | + | + | + | | − | − | − |
| 12a | + | + | | | | | | | |
| 12b | + | + | + | | | | | | |
| 12c | + | + | + | + | + | | | | |
| 12d | + | + | | | | | | | |
| 19a | + | + | + | + | + | + | + | − | − |
| 19b | | | | | | | | | − |

TABLE 23-continued

Disk (GG)

| | | | | | | | | | | | |
|---|---|---|---|---|---|---|---|---|---|---|---|
| 19c | + | + | + | + | + | + | + | + | | − | − |
| 20a | | | | | | | | | | − | − | − |
| 20b | + | + | + | + | + | + | + | | − | − | − |
| 20c | + | + | + | + | + | | | | − | − | − |

TABLE 24

Double disk

| | | | | | | | | | | | |
|---|---|---|---|---|---|---|---|---|---|---|---|
| 14a | | | | | | | − | − | − | − | − | − |
| 14b | | | | | | | | | − | − | − | − |
| 14c | | | | | | | | | | − | − | − |
| 14d | | | | | | | − | − | − | − | − | |
| 14e | | | | | | | | | | | − | |
| 14f | | | | | | | | | | | − | − |
| 14g | + | + | + | + | | | | | − | − | | |
| 14h | + | + | + | + | + | + | | | | − | | |
| 17a | + | + | + | + | + | | | | | − | | |
| 17b | + | | | | | | | | | − | | |
| 17c | | | | | | | | | − | − | − | |
| 17d | + | | | | | | | − | − | − | | |
| 12a | + | | | | | | | | | | | |
| 12b | + | | | | | | | | | | | |
| 12c | | | | | | | | | | | | |
| 12d | | | | | | | | | | | | |
| 19a | + | + | + | + | | | | | | | − | |
| 19b | | | | | | | | | | | | |
| 19c | + | + | + | + | | | | | | | − | |
| 20a | | | | | | | | | − | − | − | − |
| 20b | + | + | + | + | | | | − | − | − | | |
| 20c | + | + | | | | | | − | − | − | | |

TABLE 25

Ellipse

| | | | | | | | | | | | |
|---|---|---|---|---|---|---|---|---|---|---|---|
| 14a | | | | | | | | | − | − | − | |
| 14b | | | | | | | | | | | | |
| 14c | | | | | | | | | | | − | |
| 14d | | | | | | | | | | − | − | |
| 14e | | | | | | | | | | | | |
| 14f | | | | | | | | | | | − | |
| 14g | + | + | + | + | | | | | − | − | | |
| 14h | + | + | + | + | + | + | + | +− | +− | | | |
| 17a | + | + | + | + | | | | | − | − | − | |
| 17b | + | + | | | | | | | | | | |
| 17c | | | | | | | | | − | − | − | |
| 17d | + | + | | | | | | | | | − | |
| 12a | + | + | | | | | | | | | | |
| 12b | + | + | | | | | | | | | | |
| 12c | + | + | + | | | | | | | | | |
| 12d | + | | | | | | | | | | | |
| 19a | + | + | + | + | + | + | + | | | | − | |
| 19b | | | | | | | | | | | | |
| 19c | + | + | + | + | + | + | + | | | | | |
| 20a | | | | | | | | | | | − | − |
| 20b | + | + | + | + | + | | | | | | | − |
| 20c | + | + | + | + | | | | | | | | − |

TABLE 29

(Prior Art)
Frequency Shifts (Hz/kHz)

| Vapor | Conc. μg/L | FPOL | PEI | PBOH |
|---|---|---|---|---|
| DMAC | 81 | 67.1 | −0.68 | 2.57 |
| | 40 | 57.0 | −0.39 | 1.34 |
| | 20 | 33.9 | −0.24 | 0.62 |
| | 11 | 18.8 | −0.17 | 0.34 |

TABLE 29-continued (Prior Art)
Frequency Shifts (Hz/kHz)

| Vapor | Conc. μg/L | FPOL | PEI | PBOH |
|---|---|---|---|---|
| DMMP | 2230 | 257.6 | −2.64 | 39.53 |
| | 1100 | 207.5 | −2.25 | 21.42 |
| | 559 | 160.8 | −1.88 | 10.32 |
| | 372 | 142.2 | −2.01 | 6.73 |
| | 137 | 128.8 | −1.45 | 2.95 |
| | 84 | 102.8 | −1.15 | 1.63 |
| | 52 | 83.9 | −0.84 | 0.93 |
| | 29 | 58.7 | −0.62 | 0.44 |
| Water | 7180 | 9.7 | 35.23 | 1.35 |
| | 3550 | 4.9 | 12.85 | 0.72 |
| | 1820 | 2.5 | 4.91 | 0.52 |
| | 1210 | 1.9 | 2.86 | 0.24 |
| ISO | 12900 | 13.4 | 0.82 | 25.22 |
| | 64300 | 5.9 | 0.61 | 11.63 |
| | 33100 | 2.5 | 0.45 | 4.9 |
| | 22000 | 1.8 | 0.13 | 3.42 |
| TOL | 57300 | 22.1 | 3.22 | 77.83 |
| | 28400 | 14.5 | 1.28 | 40.68 |
| | 14500 | 7.7 | 0.56 | 17.89 |
| | 9680 | 5.4 | 0.17 | 11.15 |

What is claimed is:

1. A pattern recognition method, comprising:

(a) assigning vector coordinates to each training data point of a training data set having class assignments, and assigning vector coordinates to each test data point of a test data set to be assigned classes;

(b) determining class assignments of each test data point of said test data set by clustering those points individually with said training data set, said clustering accomplished by means of:

i) selecting each of said test data points of said test data set and selecting each of said training data points of said training data set, and ii) placing a test data point and a training data point on each of two specified positions of a region of influence that is oblong having a central portion narrowed by two opposing concave depressions with two wider larger end portions on both sides of said central portion;

(c) assigning said test data point to a class associated with said training data point if no other training data point of said training data set lies within said region of influence;

(d) assigning said test data point to an ambiguous class if said test data point groups with no class or more than one class in said training set; and (e) repeating steps (b), (c), and (d) above for said training data set and said test data set.

2. A method to verify quality of a training data set used to make class assignments of data in pattern recognition, comprising:

(a) assigning vector coordinates to each data point of a data set having predetermined class assignments;

(b) clustering said data points of said data set by placing two of said data point on each of two specified positions of a region of influence that is oblong having a central portion narrowed by two opposing concave depressions with two wider larger end portions on both sides of said central portion;

(c) assigning a same class to said clustering data points if no other training data point of said data set lies within said region of influence;

(d) assigning said test data point to an ambiguous class if said test data point groups with no class or more than one class in said training set;

(e) assigning an ambiguous class if any other data point besides said clustering data points lies within said region of influence;

(f) repeating steps (b), (c), and (d) above for said data set.

* * * * *